United States Patent
Schwengler et al.

(10) Patent No.: US 10,687,377 B2
(45) Date of Patent: Jun. 16, 2020

(54) UNIVERSAL WIRELESS STATION FOR MULTIPLE SIMULTANEOUS WIRELESS SERVICES

(71) Applicant: CenturyLink Intellectual Property LLC, Denver, CO (US)

(72) Inventors: Thomas Schwengler, Lakewood, CO (US); Thomas C. Barnett, Jr., Monroe, LA (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 386 days.

(21) Appl. No.: 15/393,581

(22) Filed: Dec. 29, 2016

(65) Prior Publication Data

US 2018/0084596 A1 Mar. 22, 2018

Related U.S. Application Data

(60) Provisional application No. 62/397,086, filed on Sep. 20, 2016, provisional application No. 62/403,878, filed on Oct. 4, 2016.

(51) Int. Cl.
*H04W 76/15* (2018.01)
*H04L 29/06* (2006.01)
(Continued)

(52) U.S. Cl.
CPC .......... *H04W 76/15* (2018.02); *H04L 69/18* (2013.01); *H04W 88/16* (2013.01); *H04W 84/12* (2013.01)

(58) Field of Classification Search
CPC ..... H04W 76/15; H04W 88/16; H04W 84/12; H04L 69/18
See application file for complete search history.

(56) References Cited

U.S. PATENT DOCUMENTS

| 2,754,101 A | 7/1956 | Haworth et al. |
| 4,034,567 A | 7/1977 | Roggen |

(Continued)

FOREIGN PATENT DOCUMENTS

| CA | 2337284 A1 | 8/2002 |
| CN | 101799987 B | 11/2011 |

(Continued)

OTHER PUBLICATIONS

International Search Report and Written Opinion prepared by the Korean Intellectual Property Office as International Searching Authority for PCT International Patent Application No. PCT/US2017/034531 dated Aug. 29, 2017; 18 pages.

(Continued)

*Primary Examiner* — Walter J Divito

(57) ABSTRACT

Novel tools and techniques are provided for implementing wireless communications, and, more particularly, for implementing multiple simultaneous wireless services using a universal wireless station. In various embodiments, a universal wireless station (and/or a computing system(s)) might determine a first set of wireless communications frequencies and protocols for communications with a second device and might determine a second set of wireless communications frequencies and protocols for communications with a third device. The universal wireless station might establish a first communications channel between the universal wireless station and the second device using the determined first set of wireless communications frequencies and protocols, establish a second communications channel between the universal wireless station and the third device using the determined second set of wireless communications frequencies and protocols, and concurrently send and receive both a first communications signal over the first communications (Continued)

channel and a second communications signal over the second communications channel.

25 Claims, 7 Drawing Sheets

(51) Int. Cl.
  *H04W 88/16* (2009.01)
  *H04W 84/12* (2009.01)

(56) References Cited

U.S. PATENT DOCUMENTS

| | | | |
|---|---|---|---|
| 4,329,083 | A | 5/1982 | Parkinson |
| 4,815,814 | A | 3/1989 | Ulijasz |
| 4,940,359 | A | 7/1990 | Van Duyn et al. |
| 5,239,129 | A | 8/1993 | Ehrenfels |
| 5,313,546 | A | 5/1994 | Toffetti |
| 5,528,684 | A | 6/1996 | Schneider et al. |
| 5,566,622 | A | 10/1996 | Ziaylek, Jr. et al. |
| 5,583,492 | A | 12/1996 | Nakanishi et al. |
| 5,606,606 | A | 2/1997 | Schneider et al. |
| 5,717,955 | A | 2/1998 | Swinehart |
| 5,760,706 | A | 6/1998 | Kiss |
| 5,879,109 | A | 3/1999 | Diermeier et al. |
| 6,099,080 | A | 8/2000 | Hirashita et al. |
| 6,125,291 | A | 9/2000 | Miesel |
| 6,272,346 | B1 | 8/2001 | Fujinami |
| 6,371,691 | B1 | 4/2002 | Finzel et al. |
| 6,414,605 | B1 | 7/2002 | Walden |
| 6,499,410 | B1 | 12/2002 | Berardi |
| 6,503,025 | B1 | 1/2003 | Miller |
| 6,807,355 | B2 | 10/2004 | Dofher |
| 6,829,424 | B1 | 12/2004 | Finzel et al. |
| 6,866,448 | B2 | 3/2005 | Finzel et al. |
| 6,990,192 | B1 | 1/2006 | Denovich et al. |
| 7,030,781 | B2 | 4/2006 | Jones |
| 7,050,683 | B2 | 5/2006 | Dofher |
| 7,095,930 | B2 | 8/2006 | Storaasli et al. |
| 7,514,628 | B2 | 4/2009 | Kadrnoska et al. |
| 7,522,805 | B2 | 4/2009 | Smith et al. |
| 7,674,980 | B2 | 3/2010 | Lubanski |
| 7,739,030 | B2 | 6/2010 | Desai |
| 7,740,417 | B2 | 6/2010 | Jang |
| 7,849,886 | B2 | 12/2010 | Carew et al. |
| D640,290 | S | 6/2011 | Stellman et al. |
| 8,061,344 | B2 | 11/2011 | Dofher |
| 8,296,383 | B2 | 10/2012 | Lindahl |
| 8,480,332 | B2 | 7/2013 | Miller |
| 8,654,936 | B1 | 2/2014 | Eslambolchi et al. |
| 9,062,423 | B2 | 6/2015 | Allouche et al. |
| 9,226,418 | B2 | 12/2015 | Magno, Jr. et al. |
| 9,270,098 | B2 | 2/2016 | Isaacks et al. |
| 9,432,340 | B1 | 8/2016 | Tutt et al. |
| 9,456,276 | B1 | 9/2016 | Chhetri |
| 9,460,618 | B1 | 10/2016 | Soltesz |
| 9,466,966 | B2 | 10/2016 | Allouche et al. |
| 9,531,174 | B2 | 12/2016 | Elford et al. |
| 9,536,425 | B1 | 1/2017 | Soltesz |
| 9,588,315 | B1 | 3/2017 | Turner |
| 9,669,872 | B2 | 6/2017 | Rebhan |
| 9,672,734 | B1 | 6/2017 | Ratnasingam |
| 9,742,172 | B2 | 8/2017 | Elford et al. |
| 9,761,136 | B2 | 9/2017 | Tonguz |
| 9,780,433 | B2 | 10/2017 | Schwengler et al. |
| 9,786,997 | B2 | 10/2017 | Schwengler et al. |
| 9,860,677 | B1 | 1/2018 | Agerstam |
| 9,917,903 | B2 | 3/2018 | Clernon |
| 10,069,751 | B2 | 9/2018 | Amulothu et al. |
| 10,253,468 | B1 | 4/2019 | Linville |
| 2001/0029311 | A1 | 10/2001 | Khare |
| 2002/0057945 | A1 | 5/2002 | Dahowski et al. |
| 2002/0061231 | A1 | 5/2002 | Finzel et al. |
| 2003/0061029 | A1 | 3/2003 | Shaket |
| 2003/0123935 | A1 | 7/2003 | Dofher |
| 2003/0210958 | A1 | 11/2003 | Nothofer |
| 2004/0083054 | A1 | 4/2004 | Jones |
| 2004/0091313 | A1 | 5/2004 | Zhou |
| 2004/0115004 | A1 | 6/2004 | Serrano |
| 2004/0129445 | A1 | 7/2004 | Winkelbach et al. |
| 2004/0142658 | A1* | 7/2004 | McKenna ............. H01Q 1/007 455/11.1 |
| 2004/0221324 | A1 | 11/2004 | Ansari et al. |
| 2004/0234215 | A1 | 11/2004 | Serrano et al. |
| 2005/0013566 | A1 | 1/2005 | Storaasli et al. |
| 2005/0191113 | A1 | 9/2005 | Frazier |
| 2005/0207711 | A1 | 9/2005 | Vo |
| 2005/0259930 | A1 | 11/2005 | Elkins et al. |
| 2005/0285807 | A1 | 12/2005 | Zehngut et al. |
| 2006/0008231 | A1 | 1/2006 | Reagan et al. |
| 2006/0093303 | A1 | 5/2006 | Reagan et al. |
| 2006/0118338 | A1 | 6/2006 | Maybury |
| 2006/0204187 | A1 | 9/2006 | Dofher |
| 2007/0018849 | A1 | 1/2007 | Salser et al. |
| 2007/0048084 | A1 | 3/2007 | Jung |
| 2007/0079113 | A1 | 4/2007 | Kulkarni et al. |
| 2007/0154152 | A1 | 7/2007 | Morris |
| 2008/0216367 | A1 | 9/2008 | Van der Poel |
| 2008/0256008 | A1 | 10/2008 | Kwok |
| 2008/0298755 | A1 | 12/2008 | Caplan et al. |
| 2008/0300776 | A1 | 12/2008 | Petrisor |
| 2008/0303654 | A1 | 12/2008 | Kates |
| 2009/0125160 | A1 | 5/2009 | Desai |
| 2009/0177172 | A1 | 7/2009 | Wilkes |
| 2009/0214163 | A1 | 8/2009 | Lu |
| 2009/0317047 | A1 | 12/2009 | Smith et al. |
| 2009/0327910 | A1 | 12/2009 | Black |
| 2010/0010117 | A1 | 1/2010 | Bricout |
| 2010/0045484 | A1 | 2/2010 | Brynielsson |
| 2010/0047021 | A1 | 2/2010 | Scola |
| 2010/0071596 | A1 | 3/2010 | Konczak |
| 2010/0086254 | A1 | 4/2010 | Dofher |
| 2010/0124332 | A1 | 5/2010 | Arena |
| 2010/0217604 | A1 | 8/2010 | Baldwin et al. |
| 2010/0243096 | A1 | 9/2010 | Berglund |
| 2010/0325421 | A1 | 12/2010 | Park et al. |
| 2011/0016754 | A1 | 1/2011 | Ruhl et al. |
| 2011/0052131 | A1 | 3/2011 | Park et al. |
| 2011/0106321 | A1 | 5/2011 | Cherian |
| 2011/0161076 | A1 | 6/2011 | Davis |
| 2011/0315259 | A1 | 12/2011 | Kelly |
| 2012/0048148 | A1 | 3/2012 | Konczak |
| 2012/0086563 | A1 | 4/2012 | Arling |
| 2012/0195694 | A1 | 8/2012 | Konczak |
| 2012/0249341 | A1 | 10/2012 | Brown |
| 2012/0268886 | A1 | 10/2012 | Leontiev |
| 2013/0009569 | A1 | 1/2013 | Knibbe |
| 2013/0011198 | A1 | 1/2013 | Pichler et al. |
| 2013/0038461 | A1 | 2/2013 | Hawkes |
| 2013/0044918 | A1 | 2/2013 | Nielsen et al. |
| 2013/0074067 | A1 | 3/2013 | Chowdhry |
| 2013/0121761 | A1 | 5/2013 | Dixon |
| 2013/0138424 | A1 | 5/2013 | Koenig |
| 2013/0216187 | A1 | 8/2013 | Dowling |
| 2013/0216313 | A1 | 8/2013 | Gustavsson et al. |
| 2013/0223807 | A1 | 8/2013 | Elford et al. |
| 2013/0238326 | A1 | 9/2013 | Kim et al. |
| 2013/0287500 | A1 | 10/2013 | Miller |
| 2013/0294839 | A1 | 11/2013 | Gustavsson et al. |
| 2013/0297199 | A1 | 11/2013 | Kapp |
| 2014/0018969 | A1 | 1/2014 | Forbes |
| 2014/0033288 | A1 | 1/2014 | Wynn |
| 2014/0146905 | A1 | 5/2014 | Zavadsky |
| 2014/0167931 | A1 | 6/2014 | Lee et al. |
| 2014/0188463 | A1 | 7/2014 | Noh et al. |
| 2014/0202571 | A1 | 7/2014 | Spijker |
| 2014/0257693 | A1 | 9/2014 | Ehlers |
| 2014/0270971 | A1 | 9/2014 | Allouche et al. |
| 2014/0275852 | A1 | 9/2014 | Hong |
| 2014/0327583 | A1 | 11/2014 | Sparks et al. |
| 2014/0343950 | A1 | 11/2014 | Simpson et al. |
| 2015/0035704 | A1 | 2/2015 | Schwengler et al. |
| 2015/0070221 | A1 | 3/2015 | Schwengler et al. |
| 2015/0110453 | A1 | 4/2015 | Elford et al. |

(56) References Cited

U.S. PATENT DOCUMENTS

| | | |
|---|---|---|
| 2015/0139598 A1 | 5/2015 | Barnes et al. |
| 2015/0230008 A1 | 8/2015 | Elford et al. |
| 2015/0249672 A1 | 9/2015 | Burns et al. |
| 2015/0288161 A1 | 10/2015 | Allouche et al. |
| 2015/0300527 A1 | 10/2015 | Konczak |
| 2015/0350247 A1 | 12/2015 | Adler et al. |
| 2015/0365278 A1 | 12/2015 | Chakrabarti et al. |
| 2016/0021127 A1 | 1/2016 | Yan |
| 2016/0029346 A1 | 1/2016 | Suresh et al. |
| 2016/0063857 A1 | 3/2016 | Fowe |
| 2016/0064829 A1* | 3/2016 | Schaepperle ........ H01Q 9/0435 343/893 |
| 2016/0080322 A1 | 3/2016 | Prisser |
| 2016/0085594 A1 | 3/2016 | Wang |
| 2016/0093213 A1 | 3/2016 | Rider |
| 2016/0109036 A1 | 4/2016 | Elford et al. |
| 2016/0109678 A1 | 4/2016 | Schwengler et al. |
| 2016/0112779 A1 | 4/2016 | Barnett, Jr. et al. |
| 2016/0187995 A1 | 6/2016 | Rosewall |
| 2016/0195876 A1 | 7/2016 | Mattsson |
| 2016/0212012 A1 | 7/2016 | Young |
| 2016/0212613 A1 | 7/2016 | Huang |
| 2016/0226231 A1 | 8/2016 | Elford et al. |
| 2016/0226674 A1 | 8/2016 | Kangshang et al. |
| 2016/0248746 A1 | 8/2016 | James |
| 2016/0267790 A1 | 9/2016 | Raamot |
| 2016/0277310 A1 | 9/2016 | Challa |
| 2016/0278599 A1 | 9/2016 | Seo |
| 2016/0294828 A1 | 10/2016 | Zakaria |
| 2016/0295364 A1 | 10/2016 | Zakaria |
| 2016/0323271 A1 | 11/2016 | Hinman |
| 2016/0330042 A1 | 11/2016 | Andersen |
| 2016/0352526 A1 | 12/2016 | Adler et al. |
| 2016/0359965 A1 | 12/2016 | Murphy et al. |
| 2017/0006141 A1 | 1/2017 | Bhadra |
| 2017/0006643 A1 | 1/2017 | Zakaria et al. |
| 2017/0026157 A1 | 1/2017 | Bugenhagen et al. |
| 2017/0026472 A1 | 1/2017 | Bugenhagen et al. |
| 2017/0059802 A1 | 3/2017 | Elford et al. |
| 2017/0060369 A1 | 3/2017 | Goyal |
| 2017/0093866 A1 | 3/2017 | Ben-Noon |
| 2017/0110784 A1 | 4/2017 | Vermes et al. |
| 2017/0134182 A1* | 5/2017 | Davis ..................... H04W 4/70 |
| 2017/0134937 A1 | 5/2017 | Miller |
| 2017/0141575 A1 | 5/2017 | Fulton |
| 2017/0171747 A1 | 6/2017 | Britt et al. |
| 2017/0187807 A1 | 6/2017 | Clernon |
| 2017/0192437 A1 | 7/2017 | Bier |
| 2017/0195318 A1 | 7/2017 | Liu |
| 2017/0201504 A1 | 7/2017 | Funk |
| 2017/0206900 A1 | 7/2017 | Lee et al. |
| 2017/0229004 A1 | 8/2017 | Shah |
| 2017/0237815 A1 | 8/2017 | Arsenault |
| 2017/0253258 A1 | 9/2017 | Bramucci |
| 2017/0274898 A1 | 9/2017 | Nakamura |
| 2017/0279620 A1 | 9/2017 | Kravitz et al. |
| 2017/0300953 A1 | 10/2017 | Kim |
| 2017/0317482 A1 | 11/2017 | Elford et al. |
| 2017/0345295 A1 | 11/2017 | Mattar |
| 2017/0345420 A1 | 11/2017 | Barnett, Jr. |
| 2017/0358025 A1 | 12/2017 | Varma |
| 2017/0358837 A1 | 12/2017 | Schwengler et al. |
| 2017/0358869 A1 | 12/2017 | Schwengler et al. |
| 2017/0371337 A1 | 12/2017 | Ramasamy |
| 2018/0040172 A1 | 2/2018 | Funk |
| 2018/0062691 A1 | 3/2018 | Barnett, Jr. |
| 2018/0103579 A1 | 4/2018 | Grufman |
| 2018/0113450 A1 | 4/2018 | Sherony |
| 2018/0122506 A1 | 5/2018 | Grantcharov |
| 2018/0132227 A1 | 5/2018 | Ghosh |
| 2018/0136424 A1 | 5/2018 | Elford |
| 2018/0168464 A1 | 6/2018 | Barnett, Jr. et al. |
| 2018/0174449 A1 | 6/2018 | Nguyen |
| 2018/0181091 A1 | 6/2018 | Funk et al. |
| 2018/0181095 A1 | 6/2018 | Funk et al. |
| 2018/0183685 A1 | 6/2018 | Cook |
| 2018/0183874 A1 | 6/2018 | Cook |
| 2018/0188704 A1 | 7/2018 | Cella |
| 2018/0196216 A1 | 7/2018 | Elford et al. |
| 2018/0299290 A1 | 10/2018 | Slavin |
| 2018/0370567 A1 | 12/2018 | Rowell |
| 2018/0374347 A1 | 12/2018 | Silver |
| 2019/0028134 A1 | 1/2019 | Barnett, Jr. |
| 2019/0035269 A1 | 1/2019 | Donovan |
| 2019/0049994 A1 | 2/2019 | Pohl |
| 2019/0073899 A1 | 3/2019 | Radomy |
| 2019/0107683 A1 | 4/2019 | Elford et al. |
| 2019/0124425 A1 | 4/2019 | Elford et al. |

FOREIGN PATENT DOCUMENTS

| | | |
|---|---|---|
| FR | 2750717 A1 | 1/1998 |
| GB | 2327680 A | 2/1999 |
| JP | 03 139705 A | 6/1991 |
| JP | 10-140507 A | 5/1998 |
| KR | 2015-0128346 A | 11/2015 |
| WO | WO 99-61710 A | 12/1999 |
| WO | WO 02-29947 A | 4/2002 |
| WO | WO-2009-098676 | 8/2009 |
| WO | WO-2013-058648 | 4/2013 |
| WO | WO 2013-130644 A1 | 9/2013 |
| WO | WO 2014-151726 A1 | 9/2014 |
| WO | WO-2017/123392 A | 7/2017 |

OTHER PUBLICATIONS

International Preliminary Report on Patentability, dated Jul. 26, 2018, 8 pages.

Alexander, Chris, et al., "Improved User Authentication in Off-The-Record Messaging", Pub. 2009, 7 pages.

Borisov, Nikita, et al., "Off-the-Record Communication, or, Why Not to Use PGP", Pub. 2004, 8 pages.

De Raimondo, Mario, et al., "Secure Off the Record Messaging", Pub. 2005; 9 pages.

Goldberg, Ian, et al., "Multi-Party Off the Record Messaging", Pub. 2007, 11 pages.

International Preliminary Report on Patentability, PCT International Application No. PCTUS17034531 dated Nov. 27, 2018, 15 pages.

U.S. Appl. No. 14/973,470; Non-Final Rejection dated Jul. 3, 2017; 34 pages.

Abram, et al.; Center for Nondestructive Evaluation, Iowa State University, Ames, IA, USA; "Effect of relative humidity . . . of polyurethane-based composites" ; 2005 Annual Report Conference on Electrical Insulation and Dielectric Phenomena; 4 pages.

European Patent Application No. 14768062.3; Extended European Search Report dated Oct. 18, 2016; 5 pages.

International Search Report and Written Opinion prepared by the U.S. Patent and Trademark Office as International Search Authority in PCT International Patent Application No. PCT/US2014/026325, dated Aug. 8, 2014; 12 pages.

International Search Report and Written Opinion prepared by the U.S. Patent and Trademark Office as International Searching Authority for PCT International Patent Application No. PCT/US2013/0280 dated May 3, 2013; 20 pages.

Lejun Qi, Linnea Petersson & Tieliang Liu (2014) Review of Recent Activities on Dielectric Films for Capacitor Applications Journal of International Council on Electrical Engineering, 4:1, 1-6, DOI: 10.5370/JICEE.2014.4.1.001.

PCT International Patent Application No. PCT/US2014/026325, International Preliminary Report on Patentability dated Sep. 15, 2015; 8 pages.

Preliminary Report on Patentability for PCT International Patent Application No. PCT/US2013/0280 dated Sep. 12, 2014; 13 pages.

Publication Notice of PCT International Patent Application No. PCT/U/26325; dated Sep. 25, 2014; 1 page.

U.S. Appl. No. 13/779,488; Final Rejection dated Sep. 24, 2015; 9 pages.

U.S. Appl. No. 13/779,488; Final Rejection dated Feb. 9, 2015; 9 pages.

(56) References Cited

OTHER PUBLICATIONS

U.S. Appl. No. 13/779,488; Final Rejection dated May 2, 2016; 7 pages.
U.S. Appl. No. 13/779,488; Non-final Rejection dated Feb. 17, 2016; 13 pages.
U.S. Appl. No. 13/779,488; Non-final Rejection dated Jun. 11, 2015; 11 pages.
U.S. Appl. No. 13/779,488; Non-final Rejection dated Sep. 10, 2014; 11 pages.
U.S. Appl. No. 13/779,488; Notice of Allowance dated Aug. 16, 2016; 16 pages.
U.S. Appl. No. 13/779,488; Requirement for Restriction/Election dated May 30, 2014; 5 pages.
U.S. Appl. No. 14/209,754; Issue Notification dated Jun. 3, 2015; 1 page.
U.S. Appl. No. 14/209,754; Non-Final Rejection dated Jan. 13, 2015; 16 pages.
U.S. Appl. No. 14/209,754; Notice of Allowance dated Feb. 18, 2015; 11 pages.
U.S. Appl. No. 14/316,665; Final Rejection dated Feb. 8, 2017; 17 pages.
U.S. Appl. No. 14/316,665; Non-Final Rejection dated Aug. 10, 2016; 38 pages.
U.S. Appl. No. 14/316,676; Non-Final Rejection dated Feb. 14, 2017; 17 pages.
U.S. Appl. No. 14/316,676; Non-Final Rejection dated Aug. 10, 2016; 43 pages.
U.S. Appl. No. 14/517,574; Final Rejection dated Jun. 16, 2016; 15 pages.
U.S. Appl. No. 14/517,574; Non-Final Rejection dated Oct. 21, 2016; 18 pages.
U.S. Appl. No. 14/517,574; Non-Final Rejection dated Feb. 26, 2016; 28 pages.
U.S. Appl. No. 14/517,574; Requirement for Restriction dated Jan. 15, 2016; 6 pages.
U.S. Appl. No. 14/578,851; Non-Final Rejection dated Nov. 17, 2016; 17 pages.
U.S. Appl. No. 14/578,851; Non-Final Rejection dated Jun. 8, 2016; 26 pages.
U.S. Appl. No. 14/746,508; Issue Notification dated Sep. 21, 2016; 1 page.
U.S. Appl. No. 14/746,508; Non-Final Rejection dated Dec. 3, 2015; 16 pages.
U.S. Appl. No. 14/746,508; Notice of Allowance dated May 25, 2016; 13 pages.
U.S. Appl. No. 14/746,508; Supplemental Notice of Allowability date Sep. 9, 2016; 3 pages.
U.S. Appl. No. 14/971,243; Non-Final Rejection dated Dec. 29, 2016; 51 pages.
U.S. Appl. No. 14/973,458; Non-Final Rejection dated Nov. 18, 2016; 21 pages.
U.S. Appl. No. 14/973,458; Non-Final Rejection dated Jun. 7, 2016; 25 pages.
U.S. Appl. No. 15/352,869; Election/Restriction Requirement dated Jan. 6, 2017; 8 pages.
International Search Report and Written Opinion prepared by the Korean Intellectual Property Office as International Searching Authority for PCT Intl Patent App. No. PCT/US2016/067938 dated Mar. 31, 2017; 11 pages.
U.S. Appl. No. 14/316,665; Notice of Allowance dated May 19, 2017; 15 pages.
U.S. Appl. No. 14/316,676; Notice of Allowance dated May 19, 2017; 12 pages.
U.S. Appl. No. 14/517,574; Final Rejection dated Mar. 24, 2017; 23 pages.
U.S. Appl. No. 14/578,851; Non-Final Rejection dated May 3, 2017; 19 pages.
U.S. Appl. No. 14/971,243; Notice of Allowance dated Apr. 17, 2017; 23 pages.
U.S. Appl. No. 14/973,458; Non-Final Rejection dated May 3, 2017; 21 pages.
U.S. Appl. No. 15/352,869; Non-Final Rejection dated May 15, 2017; 20 pages.
Stedman, Ryan, et al., "A User Study of Off-the-Record Messaging", *Symposium on Usable Privacy and Security*, Jul. 23-25 2008, 10 pages.

\* cited by examiner

UNIVERSAL WIRELESS STATION FOR MULTIPLE SIMULTANEOUS WIRELESS SERVICES

CROSS-REFERENCES TO RELATED APPLICATIONS

This application claims priority to U.S. Patent Application Ser. No. 62/397,086 (the "'086 application"), filed Sep. 20, 2016 by Thomas Schwengler et al., entitled, "Universal Wireless Station for Multiple Simultaneous Wireless Services" and U.S. Patent Application Ser. No. 62/403,878 (the "'878 application"), filed Oct. 4, 2016 by Thomas Schwengler et al., entitled, "Universal Wireless Station for Multiple Simultaneous Wireless Services."

This application may be related to U.S. patent application Ser. No. 15/392,069 (the "'069 application"), filed Dec. 28, 2016 by Jonathan J. Vermes et al., entitled, "Radiating Closures," which claims priority to U.S. Patent Application Ser. No. 62/384,023 (the "'023 application"), filed Sep. 6, 2016 by Jonathan J. Vermes et al., entitled, "Radiating Closures" and U.S. Patent Application Ser. No. 62/395,033 (the "'033 application"), filed Sep. 15, 2016 by Jonathan J. Vermes et al., entitled, "Radiating Closures." This application may also be related to U.S. patent application Ser. No. 15/393,532 (the "'532 application"), filed Dec. 29, 2016 by Michael L. Elford et al., entitled, "Distributed Broadband Wireless Implementation in Premises Electrical Devices," which claims priority to U.S. Patent Application Ser. No. 62/384,014 (the "'014 application"), filed Sep. 6, 2016 by Michael L. Elford et al., entitled, "Distributed Broadband Wireless Around Home Electrical Devices."

This application may also be related to U.S. patent application Ser. No. 15/383,623 (the "'623 application"), filed Dec. 19, 2016 by Thomas Charles Barnett, Jr., entitled, "Wearable Gesture Control Device & Method," which claims priority to U.S. Patent Application Ser. No. 62/379,090 (the "'9090 application"), filed Aug. 24, 2016 by Thomas Charles Barnett, Jr., entitled, "Wearable Gesture Control Device with Associative Touchscreen Remote." This application may also be related to U.S. patent application Ser. No. 15/385,667 (the "'667 application"), filed Dec. 20, 2016 by Thomas C. Barnett, Jr. et al. and titled, "Internet of Things (IoT) Personal Tracking Apparatus, System, and Method". This application may also be related to U.S. patent application Ser. No. 15/370,764 (the "'764 application"), filed Dec. 6, 2016 by Thomas C. Barnett, Jr. and titled, "Internet of Things (IoT) Human Interface Apparatus, System, and Method"), which claims priority to U.S. Patent Application Ser. No. 62/342,710 (the "'710 application"), filed May 27, 2016 by Thomas C. Barnett, Jr. and titled, "Internet of Things (IoT) Human Interface Apparatus, System, and Method".

This application may also be related to U.S. patent application Ser. No. 14/973,460 (the "'460 application"), filed Dec. 17, 2015 by Thomas Schwengler et al., entitled, "Apical Radiator," which claims priority to each of U.S. Patent Application Ser. No. 62/127,701 (the "'701 application"), filed Mar. 3, 2015 by Thomas Schwengler et al., entitled, "Apical Radiator" and U.S. Patent Application Ser. No. 62/188,100 (the "'100 application"), filed Jul. 2, 2015 by Thomas Schwengler et al., entitled, "Apical Radiator."

The '460 application is a continuation-in-part application of U.S. patent application Ser. No. 14/517,574 (the "'574 application"), filed on Oct. 17, 2014 by Michael L. Elford et al., entitled, "Fiber-to-the-Premises (FTTP) Methods and Systems," which claims priority to U.S. Patent Application Ser. No. 61/893,034 (the "'034 application"), filed Oct. 18, 2013 by Michael L. Elford et al., entitled, "Fiber-to-the-Home (FTTH) Methods and Systems." The '460 application is also a continuation-in-part application of U.S. patent application Ser. No. 14/578,851 (the "'851 application"), filed Dec. 22, 2014 by Michael L. Elford et al., entitled, "Point-to-Point Fiber Insertion," which claims priority to U.S. Patent Application Ser. No. 61/939,109 (the "'109 application"), filed Feb. 12, 2014 by Michael L. Elford et al., entitled, "Point-to-Point Fiber Insertion." The '460 application is also a continuation-in-part application of U.S. patent application Ser. No. 14/316,676 (the "'676 application"), filed on Jun. 26, 2014 by Thomas Schwengler et al., entitled, "Wireless Distribution Using Cabinets, Pedestals, and Hand Holes," which claims priority to U.S. Patent Application Ser. No. 61/874,691 (the "'691 application"), filed Sep. 6, 2013 by Thomas Schwengler et al., entitled, "Wireless Distribution Using Cabinets, Pedestals, and Hand Holes."

This application may be related to U.S. Patent Application Ser. No. 61/861,216 (the "'216 application"), filed Aug. 1, 2013 by Thomas Schwengler et al., entitled, "Wireless Access Point in Pedestal or Hand Hole"; and U.S. patent application Ser. No. 14/316,665 (the "'665 application"), filed on Jun. 26, 2014 by Thomas Schwengler et al., entitled, "Wireless Access Point in Pedestal or Hand Hole," which claims priority to the '216 application. This application may also be related to U.S. Patent Application Ser. No. 61/793,514 (the "'514 application"), filed Mar. 15, 2013 by Erez N. Allouche et al., entitled, "Cast-in-Place Fiber Technology"; U.S. patent application Ser. No. 14/209,754 (the "'754 application"), filed Mar. 13, 2014 by Erez N. Allouche et al., entitled, "Cast-in-Place Fiber Technology," which claims priority to the '514 application; U.S. Patent Application Ser. No. 61/604,020 (the "'020 application"), filed Feb. 28, 2012 by Michael L. Elford et al., entitled, "Apical Conduit and Methods of Using Same," U.S. Patent Application Ser. No. 61/636,227 (the "'227 application"), filed Apr. 20, 2012 by Michael L. Elford et al., entitled, "Apical Conduit and Methods of Using Same"; and U.S. patent application Ser. No. 13/779,488 (the "'488 application"), filed Feb. 27, 2013 by Michael L. Elford et al., entitled, "Apical Conduit and Methods of Using Same," which claims priority to the '020 and '227 applications.

This application may also be related to U.S. patent application Ser. No. 14/973,470 (the "'470 application"), filed Dec. 17, 2015 by Michael L. Elford et al. et al., entitled, "Apical Filler Layers," which claims priority to U.S. Patent Application Ser. No. 62/188,110 (the "'110 application"), filed Jul. 2, 2015 by Michael L. Elford et al., entitled, "Apical Filler Layers"; U.S. patent application Ser. No. 14/973,458 (the "'458 Application"), filed Dec. 17, 2015 by Thomas C. Barnett, Jr. et al., entitled, "Touchless Fiber Network," which claims priority to U.S. Patent Application Ser. No. 62/127,699 (the "'699 application"), filed Mar. 3, 2015 by Thomas C. Barnett, Jr. et al., entitled, "Touchless Fiber Network"; and U.S. patent application Ser. No. 14/971,243 (the "'243 Application"), filed Dec. 16, 2015 by Michael L. Elford et al., entitled, "MediaLink Interconnection Box," which claims priority to U.S. Patent Application Ser. No. 62/109,757 (the "'757 application"), filed Jan. 30, 2015 by Michael L. Elford et al., entitled, "MediaLink Interconnection Box (MIB)."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing wireless communications, and, more particularly, to methods, systems, and apparatuses for implementing multiple simultaneous wireless services using a universal wireless station.

BACKGROUND

Software-defined radio ("SDR") technology is useful in a number of ways. For inexpensive customer premises equipment ("CPE"), SDR provides a precious future-proof advantage. For instance, an 802.11g modem can be software upgraded to 802.11n, and later to 802.11ac, and even later to 802.11ax, and so on, using only software upgrades. This has a clear advantage on cost of operations. Conventional uses of SDR technology, however, do not appear to focus on the use that flexible hardware in combination with increasingly cheaper computing power to simultaneously or concurrently produce multiple wireless services.

Hence, there is a need for more robust and scalable solutions for implementing wireless communications, and, more particularly, to methods, systems, and apparatuses for implementing multiple simultaneous wireless services using a universal wireless station.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
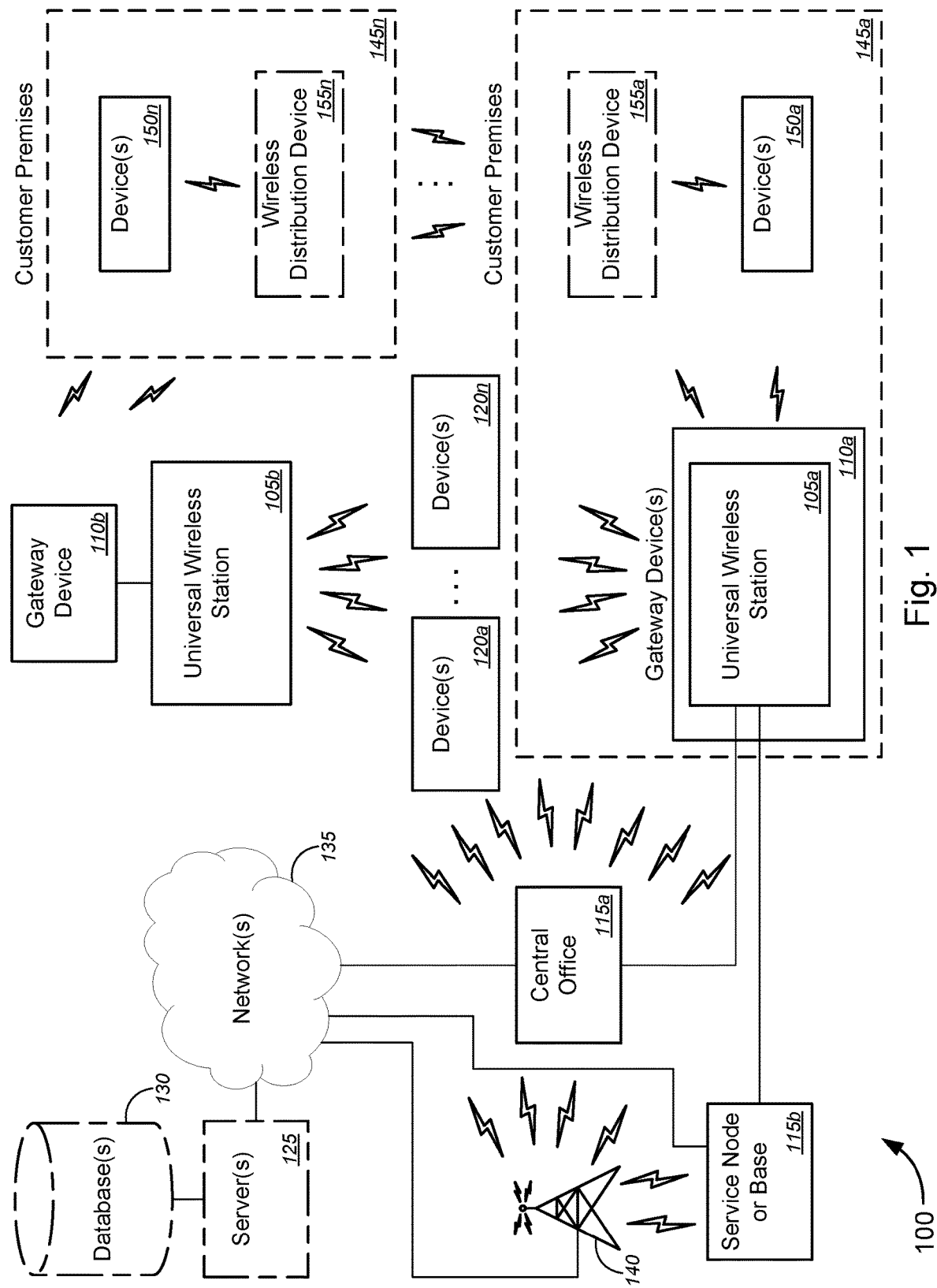
FIG. 1 is a schematic diagram illustrating a system for implementing multiple concurrent or simultaneous wireless services using a universal wireless station, in accordance with various embodiments.

Various embodiments provide tools and techniques for implementing wireless communications, and, more particularly, to methods, systems, and apparatuses for implementing multiple simultaneous or concurrent wireless services using a universal wireless station.

In various embodiments, a universal wireless station (and/or a computing system(s), or the like) might determine a first set of wireless communications frequencies and protocols for communications by the universal wireless station with a second device. The universal wireless station might establish a first communications channel between the universal wireless station and the second device using the determined first set of wireless communications frequencies and protocols. In a similar manner, the universal wireless station (and/or the computing system(s), or the like) might determine a second set of wireless communications frequencies and protocols for communications by universal wireless station with a third device. The universal wireless station might establish a second communications channel between the universal wireless station and the third device using the determined second set of wireless communications frequencies and protocols. The universal wireless station might subsequently concurrently send and receive both a first communications signal over the first communications channel between the universal wireless station and the second device using the determined first set of wireless communications frequencies and protocols, and a second communications signal over the second communications channel between the universal wireless station and the third device using the determined second set of wireless communications frequencies and protocols.

In some embodiments, the universal wireless station (and/or the computing system(s), or the like) might further determine a third set of wireless communications frequencies and protocols for communications by universal wireless station with a fourth device. The universal wireless station might establish a third communications channel between the universal wireless station and the fourth device using the determined third set of wireless communications frequencies and protocols. The universal wireless station might subsequently concurrently send and receive a first communications signal over the first communications channel between the universal wireless station and the second device using the determined first set of wireless communications frequencies and protocols, a second communications signal over the second communications channel between the universal wireless station and the third device using the determined second set of wireless communications frequencies and protocols, and a third communications signal over the third communications channel between the universal wireless station and the fourth device using the determined third set of wireless communications frequencies and protocols. And so on.

Merely by way of example, in some cases, the universal wireless station might comprise the computing system(s) and a wireless communications system. In some cases, the universal wireless station might be at least one of a residential gateway device, a business gateway device, an enterprise gateway device, or a network gateway device, and/or the like. Alternatively, the universal wireless station might be external to any gateway device, and might be communicatively coupled to at least one of a residential gateway device, a business gateway device, an enterprise gateway device, or a network gateway device, and/or the like. In some instances, the universal wireless station might comprise the wireless communications system, and the computing system might comprise one of a gateway device, a server computer, a network node, or a cloud computing system, and/or the like, each of which might be separate from the universal wireless station.

According to some embodiments, the universal wireless station might be a universal wireless station that is located within one of a residential customer premises, a business customer premises, an enterprise customer premises, a service provider facility, or a government facility, and/or the like. The second device and the third device might each comprise one of a user device associated with a user, an Internet of Things ("IoT") capable device, an IoT-capable sensor device, or telecommunications equipment, and/or the like. In some cases, the user device might comprise at least one of a tablet computer, a laptop computer, a desktop computer, a smart phone, a mobile phone, a telephone handset, a telephone base station, a facsimile machine, a household appliance, a kitchen appliance, a television, a set-top box, or a gaming console, wherein the telecommunications equipment comprises at least one of a telecommunications relay system, a satellite, a residential gateway device, a business gateway device, or customer premises equipment, and/or the like.

In the manner described herein, a wireless station (e.g., base station, CPE, or even handset or tablet, etc.) can simultaneously or concurrently (rather than following multiple software upgrades) perform in multiple standards and bands (with such standards including, without limitation, WiFi, WiMAX, LTE, cellular, etc.; with such bands including usual standard bands including, but not limited to, one of frequency bands for TV white spaces, 600 MHz, 700 MHz, cellular frequency bands, Personal Communications Service ("PCS") bands, Advanced Wireless Services ("AWS"), LoRaWAN or IEEE 802.11af 900 MHz bands, and/or 5G bands including, without limitation, 24, 28, 31, 37, 39, 42, 47, 50, 60, 70, 80, 95 GHz, or above, and/or the like. In some cases, the wireless communications protocols might include, without limitation, at least one of IEEE 802.11a, IEEE 802.11b, IEEE 802.11g, IEEE 802.11n, IEEE 802.11ac, IEEE 802.11ad, IEEE 802.11ax, IEEE 802.11ay, IEEE 802.11af, or IEEE 802.15.4, and/or the like, or at least one of Universal Mobile Telecommunications System ("UMTS"), Code Division Multiple Access ("CDMA"), Time Division Multiple Access ("TDMA"), Global System for Mobile Communication ("GSM"), Long Term Evolution ("LTE"), Personal Communications Service ("PCS"), Advanced Wireless Services ("AWS"), Emergency Alert System ("EAS"), Citizens Band Radio Service ("CBRS"), Broadband Radio Service ("BRS"), 6LowPAN, IEEE 802.11af, or LoRa, and/or the like.

In terms of application, wireless carriers might use these techniques and systems extensively for base stations, small cells, etc. Manufacturers might use these techniques and systems in access points, etc. Service providers might use these techniques and systems in CPEs (e.g., enterprise CPEs, residential CPEs, etc.), in some cases, as part of any broadband offering, including, but not limited to, DSL, PON, fixed wireless, and/or the like).

Merely by way of example, in some embodiments, antenna structures might be implemented to optimize transmission and reception of wireless signals from ground-based signal distribution devices, which include, but are not limited to, FDH, hand holes, and/or NAPs. In some cases, antenna structures might also be implemented within devices (e.g., wireless access point devices) that are imbedded or located within apical conduit channels, as described in detail in the '574 application. In some embodiments, an antenna might be provided within a signal distribution device, which might include a container disposed in a ground surface. A top portion of the container might be substantially level with a top portion of the ground surface. The antenna might be communicatively coupled to one or more of at least one conduit, at least one optical fiber line, at least one conductive signal line, or at least one power line via the container and via an apical conduit system(s) installed in a roadway. In the embodiments described with respect to the figures below, antenna structures might be implemented to optimize transmission and reception of wireless signals in below grade implementations (including, but not limited to, a closure or container that is disposed in a man hole or hand hole, mostly surrounded by air and other closures, or the like), or in aerial implementations (including, without limitation, an aerial closure or container—including, but not limited to the SLIC™ line of aerial closures by 3M™, or any suitable container that can be suspended in the air (e.g., by wires, cables, support lines, utility poles, and/or the like)). Wireless applications with such devices and systems might include, without limitation, wireless signal transmission and reception in accordance with IEEE 802.11a/b/g/n/ac/ad/ax/ay/af standards, UMTS, CDMA, LTE, PCS, AWS, EAS, BRS, and/or the like.

According to some embodiments, the methods, apparatuses, and systems might be applied to 2.4 GHz and 5 GHz wireless broadband signal distribution as used with today's IEEE 802.11a/b/g/n/ac/ax lines of products. Given the low profile devices, such methods, apparatuses, and systems may also be applicable to upcoming TV white spaces applications (and the corresponding IEEE 802.11af standard). In addition, small cells at 600 MHz and 700 MHz may be well-suited for use with these devices. In some embodiments, higher frequencies can be used such as 60 GHz and the corresponding standard IEEE 802.11ad/ay. The '574, '216, and '665 applications, which have been incorporated herein by reference in their entirety, describe in further detail embodiments utilizing wireless access points based on IEEE 802.11ad/ay and a system of ground-based signal distribution devices having these 60 GHz wireless access points disposed therein that are in line of sight of the customer premises. Methods for placing, powering, and backhauling radio access units using a combination of existing copper lines, cabinets, pedestals, hand holes, new power lines, new optical fiber connections to the customer premises, placement of radio equipment in pedestals or hand holes, and/or the like, via use of apical conduit systems are described in detail in the '034, '574, '691, '676, '216, and '665 applications, which are already incorporated herein by reference in their entirety.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a method might comprise determining, with a computing system, a first set of wireless communications frequencies and protocols for communications by a first device with a second device; establishing, with a wireless communications system, a first communications channel between the first device and the second device using the determined first set of wireless communications frequencies and protocols; determining, with the computing system, a second set of wireless communications frequencies and protocols for communications by the first device with a third device; and establishing, with the wireless communications system, a second communications channel between the first device and the third device using the determined second set of wireless communications frequencies and protocols. The method might further comprise concurrently sending and receiving, with the wireless communications system, a first communications signal over the first communications channel between the first device and the second device using the determined first set of wireless communications frequencies and protocols, and a second communications signal over the second communications channel between the first device and the third device using the determined second set of wireless communications frequencies and protocols.

In some embodiments, the first device might comprise the computing system and the wireless communications system. In some cases, the first device might be at least one of a residential gateway device, a business gateway device, an enterprise gateway device, or a network gateway device, and/or the like. Alternatively, the first device might be external to any gateway device, and might be communicatively coupled to at least one of a residential gateway device, a business gateway device, an enterprise gateway device, or a network gateway device, and/or the like. In some instances, the first device might comprise the wireless communications system, and the computing system might comprise one of a gateway device, a server computer, a network node, or a cloud computing system, and/or the like, each of which might be separate from the first device.

According to some embodiments, the first device might be a universal wireless station that is located within one of a residential customer premises, a business customer premises, an enterprise customer premises, a service provider facility, or a government facility, and/or the like. The second device and the third device might each comprise one of a user device associated with a user, an Internet of Things ("IoT") capable device, an IoT-capable sensor device, or telecommunications equipment, and/or the like. In some cases, the user device might comprise at least one of a tablet computer, a laptop computer, a desktop computer, a smart phone, a mobile phone, a telephone handset, a telephone base station, a facsimile machine, a household appliance, a kitchen appliance, a television, a set-top box, or a gaming console, wherein the telecommunications equipment comprises at least one of a telecommunications relay system, a satellite, a residential gateway device, a business gateway device, or customer premises equipment, and/or the like.

Merely by way of example, in some embodiments, the method might further comprise determining, with the computing system, a third set of wireless communications frequencies and protocols for communications by the first device with a fourth device; establishing, with the wireless communications system, a third communications channel between the first device and the fourth device using the determined third set of wireless communications frequencies and protocols; and concurrently sending and receiving, with the wireless communications system, a first communications signal over the first communications channel between the first device and the second device using the determined first set of wireless communications frequencies and protocols, a second communications signal over the second communications channel between the first device and the third device using the determined second set of wireless communications frequencies and protocols, and a third communications signal over the third communications channel between the first device and the fourth device using the determined third set of wireless communications frequencies and protocols.

According to some embodiments, the wireless communications system might comprise at least one antenna and at least one of a software-defined radio ("SDR") communications system or one or more physical layer wireless communications chipsets. In some instances, the at least one antenna might each transmit and receive wireless communication signals according to a set of protocols comprising at least one of IEEE 802.11a, IEEE 802.11b, IEEE 802.11g, IEEE 802.11n, IEEE 802.11ac, IEEE 802.11ad, IEEE 802.11ax, IEEE 802.11ay, IEEE 802.11af, or IEEE 802.15.4, and/or the like, where the set of protocols might be based at least in part on the determined first set of wireless communications frequencies and protocols, and based at least in part on the determined second set of wireless communications frequencies and protocols. In some cases, the at least one antenna might each transmit and receive wireless communication signals according to a set of protocols comprising at least one of Universal Mobile Telecommunications System ("UMTS"), Code Division Multiple Access ("CDMA"), Time Division Multiple Access ("TDMA"), Global System for Mobile Communication ("GSM"), Long Term Evolution ("LTE"), Personal Communications Service ("PCS"), Advanced Wireless Services ("AWS"), Emergency Alert System ("EAS"), Citizens Band Radio Service ("CBRS"), Broadband Radio Service ("BRS"), 6LowPAN, IEEE 802.11af, or LoRa, and/or the like, where the set of protocols might be based at least in part on the determined first set of wireless communications frequencies and protocols, and based at least in part on the determined second set of wireless communications frequencies and protocols. In some embodiments, the at least one antenna might each comprise at least one of a plurality of lateral patch antennas, a plurality of arrays of patch antennas, one or more microstrip patch antennas, a two-dimensional ("2D") leaky waveguide antenna, or a three-dimensional ("3D") array of antenna elements, and/or the like.

In another aspect, an apparatus might comprise a computing system and a wireless communications system. The computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: determine a first set of wireless communications frequencies and protocols for communications by the apparatus with a second device; and determine a second set of wireless communications frequencies and protocols for communications by the apparatus with a third device.

The wireless communications system might comprise at least one antenna, at least one second processor, and a second non-transitory computer readable medium communicatively coupled to the at least one second processor. The second non-transitory computer readable medium might have stored thereon computer software comprising a second set of instructions that, when executed by the at least one second processor, causes the wireless communications system to: establish a first communications channel between the apparatus and the second device using the determined first set of wireless communications frequencies and protocols; establish a second communications channel between the apparatus and the third device using the determined second set of wireless communications frequencies and protocols; and concurrently send and receive, via the at least one antenna, a first communications signal over the first communications channel between the apparatus and the second device using the determined first set of wireless communications frequencies and protocols, and a second communications signal over the second communications channel between the apparatus and the third device using the determined second set of wireless communications frequencies and protocols.

In some embodiments, the apparatus might be at least one of a residential gateway device, a business gateway device, an enterprise gateway device, or a network gateway device, and/or the like. Alternatively, the apparatus might be external to any gateway device, and might be communicatively coupled to at least one of a residential gateway device, a business gateway device, an enterprise gateway device, or a network gateway device, and/or the like.

According to some embodiments, the apparatus might be a universal wireless station that is located within one of a residential customer premises, a business customer premises, an enterprise customer premises, a service provider facility, or a government facility, and/or the like. The second device and the third device might each comprise one of a user device associated with a user, an Internet of Things ("IoT") capable device, an IoT-capable sensor device, or telecommunications equipment, and/or the like. In some cases, the user device might comprise at least one of a tablet computer, a laptop computer, a desktop computer, a smart phone, a mobile phone, a telephone handset, a telephone base station, a facsimile machine, a household appliance, a kitchen appliance, a television, a set-top box, or a gaming console, wherein the telecommunications equipment comprises at least one of a telecommunications relay system, a satellite, a residential gateway device, a business gateway device, or customer premises equipment, and/or the like.

Merely by way of example, in some embodiments, the first set of instructions, when executed by the at least one first processor, might further cause the computing system to: determine a third set of wireless communications frequencies and protocols for communications by the apparatus with a fourth device. In some cases, the second set of instructions, when executed by the at least one second processor, further causes the wireless communications system to: establish a third communications channel between the apparatus and the fourth device using the determined third set of wireless communications frequencies and protocols; and concurrently send and receive, via the at least one antenna, a first communications signal over the first communications channel between the apparatus and the second device using the determined first set of wireless communications frequencies and protocols, a second communications signal over the second communications channel between the apparatus and the third device using the determined second set of wireless communications frequencies and protocols, and a third communications signal over the third communications channel between the apparatus and the fourth device using the determined third set of wireless communications frequencies and protocols.

According to some embodiments, the wireless communications system might comprise at least one of a software-defined radio ("SDR") communications system or one or more physical layer wireless communications chipsets. In some instances, the at least one antenna might each transmit and receive wireless communication signals according to a set of protocols comprising at least one of IEEE 802.11a, IEEE 802.11b, IEEE 802.11g, IEEE 802.11n, IEEE 802.11ac, IEEE 802.11ad, IEEE 802.11ax, IEEE 802.11ay, IEEE 802.11af, or IEEE 802.15.4, and/or the like, where the set of protocols might be based at least in part on the determined first set of wireless communications frequencies and protocols, and based at least in part on the determined second set of wireless communications frequencies and protocols. In some cases, the at least one antenna might each transmit and receive wireless communication signals according to a set of protocols comprising at least one of Universal Mobile Telecommunications System ("UMTS"), Code Division Multiple Access ("CDMA"), Time Division Multiple Access ("TDMA"), Global System for Mobile Communication ("GSM"), Long Term Evolution ("LTE"), Personal Communications Service ("PCS"), Advanced Wireless Services ("AWS"), Emergency Alert System ("EAS"), Citizens Band Radio Service ("CBRS"), Broadband Radio Service ("BRS"), 6LowPAN, IEEE 802.11af, or LoRa, and/or the like, where the set of protocols might be based at least in part on the determined first set of wireless communications frequencies and protocols, and based at least in part on the determined second set of wireless communications frequencies and protocols. In some embodiments, the at least one antenna might each comprise at least one of a plurality of lateral patch antennas, a plurality of arrays of patch antennas, one or more micro-strip patch antennas, a two-dimensional ("2D") leaky waveguide antenna, or a three-dimensional ("3D") array of antenna elements, and/or the like.

In yet another aspect, a system might comprise a first device, a second device, and a third device, and/or the like. The first device might comprise a computing system and a wireless communications system. The computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: determine a first set of wireless communications frequencies and protocols for communications by the first device with a second device; and determine a second set of wireless communications frequencies and protocols for communications by the first device with a third device.

The wireless communications system might comprise at least one first antenna, at least one first transceiver, at least one second processor, and a second non-transitory computer readable medium communicatively coupled to the at least one second processor. The second non-transitory computer readable medium might have stored thereon computer software comprising a second set of instructions that, when executed by the at least one second processor, causes the wireless communications system to: establish a first communications channel between the first device and the second device using the determined first set of wireless communications frequencies and protocols; establish a second communications channel between the first device and the third device using the determined second set of wireless communications frequencies and protocols; and concurrently send and receive, via the at least one antenna, a first communications signal over the first communications channel between the first device and the second device using the determined first set of wireless communications frequencies and protocols, and a second communications signal over the second communications channel between the first device and the third device using the determined second set of wireless communications frequencies and protocols.

The second device might comprise at least one second antenna; at least one second transceiver; at least one third processor; and a third non-transitory computer readable medium communicatively coupled to the at least one third processor. The third non-transitory computer readable medium might have stored thereon computer software comprising a third set of instructions that, when executed by the at least one third processor, causes the second device to: receive and send, via the at least one second transceiver and the at least one second antenna, the first communications signal over the first communications channel between the first device and the second device using the determined first set of wireless communications frequencies and protocols.

The third device might comprise at least one third antenna; at least one third transceiver; at least one fourth processor; and a fourth non-transitory computer readable medium communicatively coupled to the at least one fourth processor. The fourth non-transitory computer readable medium might have stored thereon computer software comprising a fourth set of instructions that, when executed by the at least one fourth processor, causes the third device to: receive and send, via the at least one third transceiver and the at least one third antenna, the second communications signal over the second communications channel between the first device and the third device using the determined second set of wireless communications frequencies and protocols.

According to some embodiments, the first device might be a universal wireless station that is located within one of a residential customer premises, a business customer premises, an enterprise customer premises, a service provider facility, or a government facility, and/or the like. The second device and the third device might each comprise one of a user device associated with a user, an Internet of Things ("IoT") capable device, an IoT-capable sensor device, or telecommunications equipment, and/or the like. In some cases, the user device might comprise at least one of a tablet computer, a laptop computer, a desktop computer, a smart phone, a mobile phone, a telephone handset, a telephone base station, a facsimile machine, a household appliance, a kitchen appliance, a television, a set-top box, or a gaming console, wherein the telecommunications equipment comprises at least one of a telecommunications relay system, a satellite, a residential gateway device, a business gateway device, or customer premises equipment, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing wireless communications, and, more particularly, to methods, systems, and apparatuses for implementing multiple simultaneous or concurrent wireless services using a universal wireless station, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

Throughout these embodiments, wireless access points—such as ones operating under any of the IEEE 802.11a/b/g/n/ac/ad/ax/ay/af standards discussed above, and described in detail in the '034, '574, '691, '676, '216, and '665 applications, which are already incorporated herein by reference in their entirety—may be implemented in any of ground-based signal distribution devices (including, without limitation, the FDH, the NAPs, the handholes, the NIDs, the ONTs, and/or the like), in below grade implementations (including, but not limited to, a closure or container that is disposed in a man hole or hand hole, mostly surrounded by air and other closures, or the like), or in aerial implementations (including, without limitation, an aerial closure or container—including, but not limited to the SLIC™ line of aerial closures by 3M™, or any suitable container that can be suspended in the air (e.g., by wires, cables, support lines, utility poles, and/or the like)). In some embodiments, wireless access points may be disposed within compact devices that are disposed within apical conduit channels, at the top of apical conduit channels, or near the top of apical conduit channels, as described in detail in the '574 application. In some cases, some or all of these wireless access points may be powered by power lines that are disposed along with the signal lines or fiber lines within the apical conduit system, and such powering of wireless access points is described in detail in the '691 and '676 applications, already incorporated herein by reference in their entirety. The wireless access points may be part of small cells, micro cells, femto cells, pico cells, and/or the like, as appropriate or desired.

With reference to the figures, FIG. 1 is a schematic diagram illustrating a system 100 for implementing multiple concurrent or simultaneous wireless services using a universal wireless station, in accordance with various embodiments.

In the non-limiting embodiment of FIG. 1, system 100 might comprise one or more universal wireless stations 105a and 105b (collectively, "universal wireless station 105" or the like), one or more gateway devices 110a and 110b (collectively, "gateway device 110," "devices 110," or the like), a network node(s) 115a and 115b (which might each include, without limitation, a central office ("CO"), a service node or service provider node, a base unit, a wireless base station, and/or the like; collectively, "service nodes 115," "service provider access points 115," or the like), and one or more devices 120a-120n (collectively, "devices 120" or the like). In some embodiments, the universal wireless station might be disposed within the gateway device (such as universal wireless station 105a being disposed within gateway device 110a, as shown, e.g., in FIG. 1, or the like). In some cases, the universal wireless station might be separate from, or external to, any gateway devices, and might be communicatively coupled to the gateway device (such as universal wireless station 105b being separate from, or external to, any gateway devices, yet being communicatively coupled to gateway device 110b, as shown, e.g., in FIG. 1, or the like).

In some embodiments, system 100 might further comprise one or more servers 125 (optional; also referred to as "service provider servers 125," "network servers 125," "servers 125," or the like), one or more databases 130 (optional) that are associated with the one or more servers 125, one or more networks 135, and one or more telecommunications relay systems 140, and/or the like. System 100 might further comprise one or more customer premises 145a-145n (collectively, "customer premises 145," "premises 145," "locations 145," or the like), one or more devices 150a-150n (collectively, "devices 150," "premises devices 150," "indoor devices 150," or "indoor premises devices 150," or the like), one or more wireless distribution devices 155a-155n (collectively, "wireless distribution devices 155," "devices 155," or the like), and/or the like. The devices 150 and the wireless distribution devices 155 might be disposed or located within one or more of the customer premises 145a-145n, while the devices 120 might be disposed or located outside or external to any of the customer premises 145a-145n. According to some embodiments, the gateway devices 110 and/or the universal wireless stations 105 might be disposed within one or more of the customer premises 145 (such as universal wireless station 105a and gateway device 110a being disposed within customer premises 145a, as shown, e.g., in FIG. 1, or the like). Alternatively, or additionally, the gateway devices 110 and/or the universal wireless stations 105 might be disposed outside or external to the customer premises 145 (such as universal wireless station 105b and gateway device 110b being disposed outside or external to customer premises 145n, as shown, e.g., in FIG. 1, or the like).

The universal wireless station 105a and/or 105b might send and/or receive communication signals to and/or from a service provider access point (including, but not limited to, CO 115a or service node or base 115b, or the like) and to and/or from at least one of the one or more devices 120a-120n or the one or more devices 150a-150n, or the like, in some cases via one or more antennas (such as the antennas as described in detail in the '069, '532, '460, '676, and '665 applications, which have already been incorporated herein by reference in their entirety for all purposes). In some cases, the service provider access point(s) 115 might communicatively couple with the one or more servers 125 (and associated databases 130) via the network(s) 135 (and in some cases, via the one or more telecommunications relay systems 140, which might include, without limitation, one or more wireless network interfaces (e.g., wireless modems, wireless access points, and the like), one or more towers, one or more satellites, and/or the like). The server(s) 125 and/or the network(s) 135 (e.g., the Internet or the like) might exchange data (including, but not limited to, media content, information, VoIP communications, messaging communications (e.g., e-mail messages, short message service ("SMS") messages, chat messages, multimedia messaging service ("MMS") messages, and/or the like), any other data, etc.) with the at least one of the one or more devices 120a-120n or the one or more devices 150a-150n, or the like, via the universal wireless stations 105 or via the gateway devices 110, and in some cases, also via wireless distribution devices 155 or the like. According to some embodiments, wireless distribution devices 155 in one customer premises 145 might relay wireless communications from one to other wireless distribution devices 155 in other customer premises 145. For example, the universal wireless station 105 might be located near device 150a, which is located on customer premises 145a, but might be somewhat distant (or perhaps out of wireless range with respect to customer premises 145n). In such a case, the wireless distribution device 155a that is located on customer premises 145a might relay the wireless communications to user device 150n in customer premises 145n, via wireless distribution device 155a (located in customer premises 145a) and via wireless distribution device 155n (located in customer premises 145n) (and via any intermediate wireless distribution devices 155 that are located in intermediate customer premises 145 between customer premises 145a and 145n). In this manner, the wireless distribution devices 155 might relay using any suitable number of hops to connect any user device 150 or other devices that are perhaps not within wireless range of the universal wireless station 105. Alternatively, or additionally, user device 150 or other devices might be within wireless range of the universal wireless station 105 or some other wireless router or node, but the signal from these sources might be weak (or bandwidth might otherwise be low), in which case, the multiple hops via the wireless distribution devices 155 might supplement the wireless signal so as to boost bandwidth or network speed, or the like. Although lightning bolt symbols are used to denote wireless communications between two or more of the universal wireless station 105a or 105b, the gateway devices 110a or 110b, the service provider access points 115, the devices 120, the devices 150, and/or the wireless distribution devices 155, the various embodiments are not so limited, and wired as well as wireless communications may be used. In any event, most communications would be machine-to-machine communications (which, in some cases, might be autonomous, while in other cases might be user-initiated, or the like).

In operation, according to some embodiments, the universal wireless station 105 (and/or one or more computing systems, which might include, but are not limited to, servers 125, service provider access point(s) or nodes 115, the gateway devices 110, and/or the like) might determine a first set of wireless communications frequencies and protocols for communications by the universal wireless station 105 with a second device (such as one of devices 120a-120n, 150a-150n, 155a-155n, or the like). The universal wireless station 105 might establish a first communications channel between the universal wireless station 105 and the second device using the determined first set of wireless communications frequencies and protocols. In a similar manner, the universal wireless station 105 (and/or the one or more computing systems, or the like) might determine a second set of wireless communications frequencies and protocols for communications by universal wireless station 105 with a third device (such as another one of devices 120a-120n, 150a-150n, 155a-155n, or the like). The universal wireless station 105 might establish a second communications channel between the universal wireless station 105 and the third device using the determined second set of wireless communications frequencies and protocols. The universal wireless station 105 might subsequently concurrently send and receive both a first communications signal over the first communications channel between the universal wireless station 105 and the second device using the determined first set of wireless communications frequencies and protocols, and a second communications signal over the second communications channel between the universal wireless station 105 and the third device using the determined second set of wireless communications frequencies and protocols.

In some embodiments, the universal wireless station 105 (and/or the one or more computing systems, or the like) might further determine a third set of wireless communications frequencies and protocols for communications by universal wireless station 105 with a fourth device (such as yet another one of devices 120a-120n, 150a-150n, 155a-155n, or the like). The universal wireless station 105 might establish a third communications channel between the universal wireless station 105 and the fourth device using the determined third set of wireless communications frequencies and protocols. The universal wireless station 105 might subsequently concurrently send and receive a first communications signal over the first communications channel between the universal wireless station 105 and the second device using the determined first set of wireless communications frequencies and protocols, a second communications signal over the second communications channel between the universal wireless station 105 and the third device using the determined second set of wireless communications frequencies and protocols, and a third communications signal over the third communications channel between the universal wireless station 105 and the fourth device using the determined third set of wireless communications frequencies and protocols. And so on.

According to some embodiments, the wireless communications frequencies might comprise frequency bands including, without limitation, at least one of frequency bands for TV white spaces, 600 MHz, 700 MHz, cellular frequency bands, Personal Communications Service ("PCS") bands, Advanced Wireless Services ("AWS"), LoRaWAN or IEEE 802.11af 900 MHz bands, and/or 5G bands including, but not limited to, 24, 28, 31, 37, 39, 42, 47, 50, 60, 70, 80, 95 GHz, or above, and/or the like. In some cases, the wireless communications protocols might include, without limitation, at least one of IEEE 802.11a, IEEE 802.11b, IEEE 802.11g, IEEE 802.11n, IEEE 802.11ac, IEEE 802.11ad, IEEE 802.11ax, IEEE 802.11ay, IEEE 802.11af, or IEEE 802.15.4, and/or the like, or at least one of Universal Mobile Telecommunications System ("UMTS"), Code Division Multiple Access ("CDMA"), Time Division Multiple Access ("TDMA"), Global System for Mobile Communication ("GSM"), Long Term Evolution ("LTE"), Personal Communications Service ("PCS"), Advanced Wireless Services ("AWS"), Emergency Alert System ("EAS"), Citizens Band Radio Service ("CBRS"), Broadband Radio Service ("BRS"), 6LowPAN, IEEE 802.11af, or LoRa, and/or the like.

Merely by way of example, the universal wireless station 105 might comprise at least one antenna and a software-defined radio ("SDR") communications system (as shown and described below with respect to embodiment 200 of FIG. 2A, or the like). Alternatively, or additionally, the universal wireless station 105 might comprise at least one antenna and one or more physical layer wireless communications chipsets (as shown and described below with respect to embodiment 200' of FIG. 2B, or the like). In some instances, the at least one antenna might each transmit and receive wireless communication signals according to a set of protocols comprising at least one of IEEE 802.11a, IEEE 802.11b, IEEE 802.11g, IEEE 802.11n, IEEE 802.11ac, IEEE 802.11ad, IEEE 802.11ax, IEEE 802.11ay, IEEE 802.11af, or IEEE 802.15.4, and/or the like, where the set of protocols might be based at least in part on the determined first set of wireless communications frequencies and protocols, and based at least in part on the determined second set of wireless communications frequencies and protocols. In some cases, the at least one antenna might each transmit and receive wireless communication signals according to a set of protocols comprising at least one of Universal Mobile Telecommunications System ("UMTS"), Code Division Multiple Access ("CDMA"), Time Division Multiple Access ("TDMA"), Global System for Mobile Communication ("GSM"), Long Term Evolution ("LTE"), Personal Communications Service ("PCS"), Advanced Wireless Services ("AWS"), Emergency Alert System ("EAS"), Citizens Band Radio Service ("CBRS"), Broadband Radio Service ("BRS"), 6LowPAN, IEEE 802.11af, or LoRa, and/or the like, where the set of protocols might be based at least in part on the determined first set of wireless communications frequencies and protocols, and based at least in part on the determined second set of wireless communications frequencies and protocols. In some embodiments, the at least one antenna might each comprise at least one of a plurality of lateral patch antennas, a plurality of arrays of patch antennas, one or more micro-strip patch antennas, a two-dimensional ("2D") leaky waveguide antenna, or a three-dimensional ("3D") array of antenna elements, and/or the like. In some cases, one or more of the at least one antenna might include at least one active antenna element. Alternatively, one or more of the at least one antenna might include only passive antenna elements. These and other antennas that may be used in conjunction with the universal wireless station described herein are described in greater detail in the Related Applications, particularly in the '069, '532, '460, '676, and '665 applications, which have already been incorporated herein by reference in their entirety for all purposes.

In sum, the universal wireless station 105 (which includes, for example, customer premises equipment ("CPE") or the like for use in enterprise or residential environments, or the like) can simultaneously or concurrently operate in several standards and frequencies—for instance, operating under WiFi, LTE, and/or IoT standards (with IoT standards including 6LowPAN and LoRa, or the like). In this way, the universal wireless station 105 can be an access point, a small cell, and an IoT base, simultaneously or concurrently, and, in some cases, with the same radio frequency ("RF" or "rf") transmit stage or the like. In some embodiments, field programmable gate arrays ("FPGAs"), filters, amplifiers, and/or software-defined stages, or the like may be used within the universal wireless station 105 to implement the multiple concurrent or simultaneous wireless services as described herein.

Software-defined radio ("SDR") is one way to implement the multiple concurrent or simultaneous wireless services (in some cases, using software to combine simultaneous or concurrent operations on multiple possibly different physical layers and standards, or the like). Alternatively, or additionally, use of multiple physical layer chipsets is another way to implement the multiple concurrent or simultaneous wireless services. In some instances, a common backhaul can be provided to the universal wireless station, or alternatively one of the wireless modes may operate a backhaul function (in some cases, as a wireless mesh node, or the like).

A confluence of the following three main technology trends has made the use of SDR in this manner a possibility: (1) flexible RF frontends—cheap, wideband, simple RF frontend generic cards are now available that can handle a wide range of spectrum and bandwidth, including filtering and amplification, including multiple wideband carriers and wave fronts, or the like; (2) powerful programmable baseband—FPGAs, which are arrays of configurable logic blocks ("CLBs"), may be used for powerful digital signal processing ("DSP") needs such as fast Fourier transform ("FTT"; which transforms from time domain to frequency domain) or inverse fast Fourier transform ("IFFT"; which transforms from frequency domain to time domain), or the like; and (3) improved processor power (including, but not limited to, central processing unit ("CPU") and graphical processing unit ("GPU"), or the like) can now process massive computations (in terms of number of computations and complexity of computations) in parallel (which can be used, e.g., for multiple wireless standards). One ancillary approach concerns the use of devices with multimedia needs, including, without limitation, residential gateways, entertainment devices, personal computers, tablets, and mobile phones. These devices now comprise powerful GPUs that are capable of handling 4 k video for every residential gateway or the like. These GPUs, however, are generally idle or often underutilized. Compute languages, such as OpenCL or the like, allow the use of GPUs for any (C or C++) coding or the like, including DSP for wireless communications. In this manner, the underutilized or idle GPUs (and/or improved CPUs) can be put to good use by performing the massive computations in parallel (in some cases, in conjunction with the use of the flexible RF frontend, the baseband FPGA, or the like) to implement the multiple simultaneous or concurrent wireless reception and transmission, or the like.

In a non-limiting example of a residential use case, a residential gateway may be integrated with a universal wireless station ("UWS"), or it can be a separate device (either packaged together, or connected by USB connection, Ethernet connection, or wireless connection, and the like). In a first step, a residential gateway may contain the latest 802.11ac access point or the like. The access point could be a specific chip or can be implemented using a SDR chain approach (which is common as a stand-alone application). In a second step, as a customer uses an LTE phone, for instance, the UWS could be configured to augment the LTE signal by creating a LTE small cell. Alternatively, the UWS can detect the customer use and can automatically prompt if the customer might be interested in adding a small cell. If so configured, the UWS may start to scan and receive all appropriate LTE channels and services relevant to the customer (including, for example, all carriers aggregated by their LTE service, or the like). In this example, the UWS is now both a WiFi access point and an LTE small cell, simultaneously or concurrently. In a third step, the customer might subscribe to any other service, and the UWS can be easily configured to adapt to it (for instance, adapting to a Bluetooth server for audio throughout the home, or the like). Of particular importance might be an IoT gateway or hub for any IoT needs (e.g., security, home automation, etc.), which is described in greater detail with respect to the '623, '667, and '764 applications, which have already been incorporated herein by reference in their entirety for all purposes. The UWS can easily add the low-power needs required for IoT such as ZigBee or 6LowPAN IEEE 802.15.4, IEEE 802.11af, or LoRa, which are fairly open standards that are easy to demodulate and decode. One exception, which might be slightly more complex to deal with yet still feasible, is the use of LoRa; LoRaWAN is a new low power standard for IoT that functions at 900 MHz. LoRa operates using chirp spread spectrum ("CSS") techniques, not unlike some radars (with CSS, some sequences of up-chirps and down-chirps may be used for preamble and data transfer, or the like). In a fourth step, a residential gateway might typically provide backhaul to all services (for instance, over ADSL, ADSL2+, VDSL, VDSL2, G.fast, or any flavor of passive optical network ("PON"), Ethernet, or other wireless or wired service, and the like). It may be useful for the UWS to provide backhaul (for instance, if no DSL/PON service is available, or if it is temporarily down or not operating. The UWS adds wavefront and processing for another simultaneous or concurrent service, this time for backhaul, thus making the UWS (and associated residential gateway) a wireless mesh node that can connect to other neighboring UWS/residential gateways or wireless base station providing service in the area.

In a non-limiting example of an enterprise use case, an enterprise embodiment of the UWS might be similar to the residential use case with the following distinctions: (a) the first through third steps might likely be provisioned in advance, and can be managed by the customer or by the service provider; (b) the fourth step might provide a precious redundancy option for enterprise services (for example, if wired service is interrupted, UWS can be configured to go down a list of preferred wireless access networks, and configure UWS to restore service using the preferred wireless access networks that are listed, or the like; and (c) the hardware (e.g., RF frontend, FPGA, CPU/GPU, etc.) that are involved are more capable, more expensive, and can achieve a combination of many more services than simply that of an access point or small cell [for instance, the enterprise hardware for UWS can be used to: (i) provide coverage including neutral host distributed antenna system ("DAS") and WiFi; (ii) adapt to needs in venue according to needs for capacity; (iii) provide flexibility such as disabling DAS or corporate WiFi during off-hours for security needs or the like; and/or (iv) implement other classic enterprise features; and/or the like]; etc.

According to some embodiments, although the various embodiments may be well suited for use with a simple antenna (such as a log periodic dipole antenna ("LPDA") that is often used for applications covering a wide range of frequencies, or the like), the various embodiments can be improved with the use of tunable antennas. Here, a tunable antenna refers to an antenna that can be optimized to have a certain impedance at one or more given frequencies. There are many tuning methods, including, but not limited to, switch grids of variable capacitors or diodes that can be controlled by FPGA, or the like. FPGA controllers may be ideal for controlling a wide range of SDR applications. In some embodiments, tuning can be optimized on multiple bands simultaneously or concurrently. For instance, impedance may not be able to match exactly in all frequencies of use, but average weighted criteria can be optimized for all frequencies.

In some embodiments, relevant tuning methods might include, without limitation, impedance matching, aperture or element tuning, filter tuning, or the like. Impedance matching is the most common method. With impedance matching, tunable elements can be made of various length stubs, loops, or other transmission lines with some way of varying lengths, or switching between paths (e.g., with capacitors, or active elements like diodes, or the like). This technique applies well to a front end adjustable stage for SDR. For aperture or element tuning, varying the antenna aperture size, or the sets of radiating elements (including, but not limited to, patch antennas, dipoles, etc.) allows for a wide range of antenna range. Variable or digitally tuned capacitors, or active switches may be controlled and can vary the antenna aperture dynamically as needed by SDR. Filter tuning, in some cases, can complement tunable antennas. Again, digitally tunable capacitors, diodes, transistors, and/or other variable components may be used to filter one or several bands of interest for SDR processing.

These and other functions of the system 100 (and its components) are described in greater detail below with respect to FIGS. 2-4.

Figure 2A:
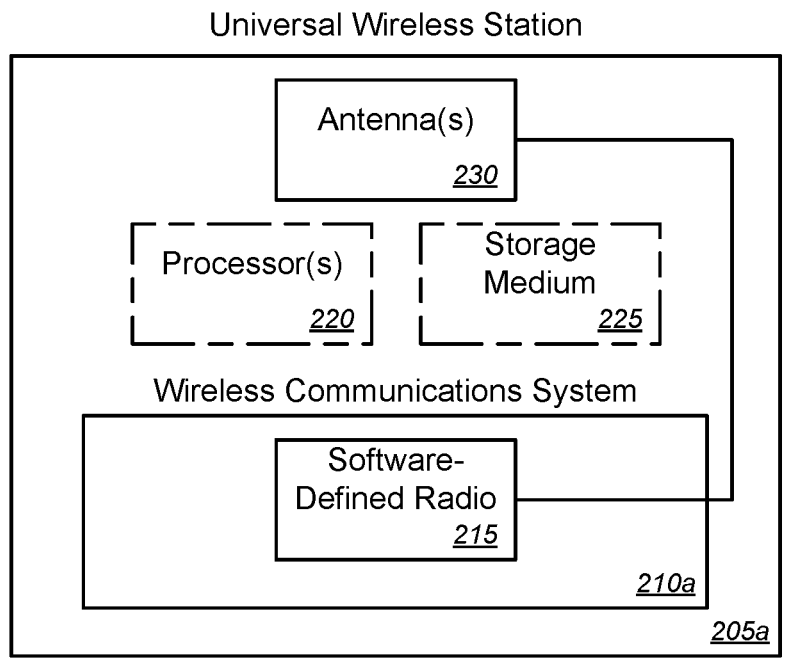
FIGS. 2A and 2B are schematic diagrams illustrating various embodiments of a universal wireless station that may be used for implementing multiple concurrent or simultaneous wireless services.
Figure 2B:
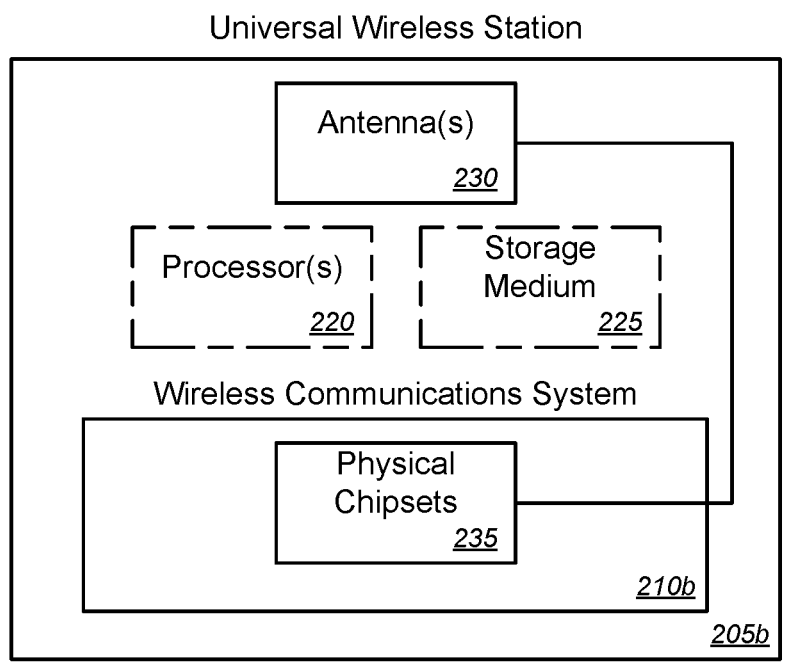

FIGS. 2A and 2B (collectively, "FIG. 2") are schematic diagrams illustrating various embodiments 200 and 200' of a universal wireless station that may be used for implementing multiple concurrent or simultaneous wireless services.

With reference to the non-limiting embodiment 200 of FIG. 2A, universal wireless station 205a might comprise a wireless communications system 210a, which might comprise a software-defined radio ("SDR") 215 (which is described in detail above with respect to FIG. 1). Universal wireless station 205a might further comprise one or more processors 220 (optional) and a storage medium 225 (optional) that are disposed within the universal wireless station 205a. Universal wireless station 205a might further comprise one or more antennas 230 (which are also described in detail above with respect to FIG. 1). The SDR 215 might be communicatively coupled to the one or more antennas 230, which might then direct the signals to devices external to the wireless communications system 210a (as shown with respect to UWS 105b of FIG. 1, or the like) or external to the gateway device in which the wireless communications system might be disposed in some embodiments (as shown with respect to UWS 105a disposed within gateway device 110a of FIG. 1, or the like). The SDR 215 (in some cases, in conjunction with the one or more processors 220) might control the one or more antennas 230 to send and receive signals over multiple simultaneous or concurrent bands or protocols to one or more devices, as described in detail above with respect to FIG. 1.

The universal wireless station 205a of embodiment 200 of FIG. 2A might be similar, if not identical, to the universal wireless station 105 of system 100 of FIG. 1, and the descriptions of the universal wireless station 105 of system 100 of FIG. 1 are applicable to the universal wireless station 205a of embodiment 200 of FIG. 2A.

The non-limiting embodiment 200' of FIG. 2B is similar, if not identical, to the embodiment 200 of FIG. 2A, except that wireless communications system 210b (disposed in universal wireless station 205b) comprises physical layer wireless communications chipsets or physical chipsets 235 instead of SDR 215. The physical chipsets 235 perform similar functionalities as the SDR 215; whereas SDR 215 uses software to control the antennas 230, the physical chipsets 235 use physical circuitry and circuit components to control the antennas 230. The universal wireless station 205b of embodiment 200' of FIG. 2B might be similar, if not identical, to the universal wireless station 105 of system 100 of FIG. 1, and the descriptions of the universal wireless station 105 of system 100 of FIG. 1 are applicable to the universal wireless station 205b of embodiment 200' of FIG. 2B.

Figure 3:
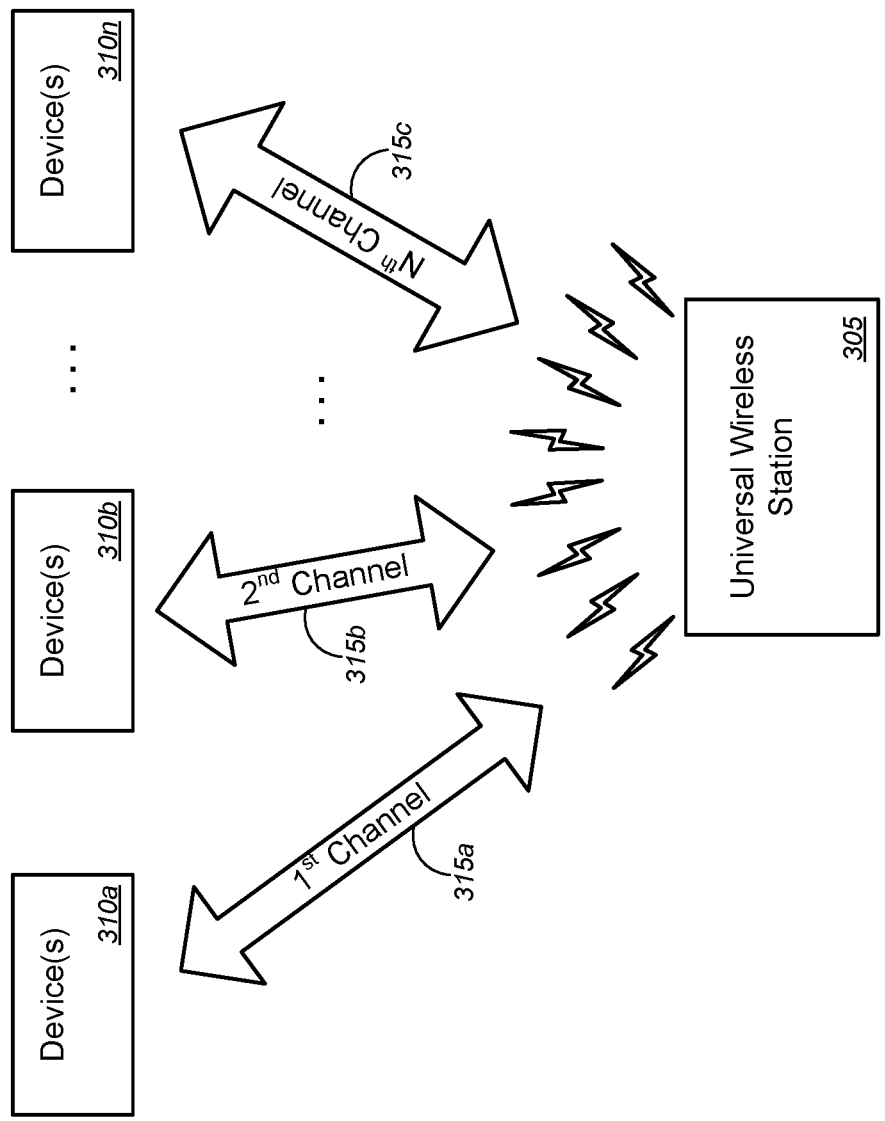
FIG. 3 is a schematic diagram illustrating a system that is implementing multiple concurrent or simultaneous wireless services by a universal wireless station, in accordance with various embodiments.

FIG. 3 is a schematic diagram illustrating a system 300 that is implementing multiple concurrent or simultaneous wireless services by a universal wireless station, in accordance with various embodiments.

In the non-limiting embodiment of FIG. 3, system 300 might comprise a universal wireless station 305 (which might correspond to universal wireless stations 105a, 105b, 205a, and 205b of FIGS. 1 and 2, or the like) and a plurality of devices 310a-310n (collectively, "devices 310" or the like; which might correspond to devices 120a-120n and 150a-150n of FIG. 1, or the like). As shown in FIG. 3, universal wireless station 305 communicates with each of the plurality of devices 310a-310n over corresponding or respective first wireless communications channel 315a, second wireless communications channel 315b, through $N^{th}$ wireless communications channel 315n (collectively, "wireless communications channels 315," "wireless channels 315," "channels 315," or the like). The lightning bolt symbols are used to denote wireless communications between the universal wireless station 305 and each of the devices 310. In any event, most communications would be machine-to-machine communications (which, in some cases, might be autonomous, while in other cases might be user-initiated, or the like).

In sum, FIG. 3 depicts the implementation of multiple concurrent or simultaneous wireless communications between the universal wireless station 305 and each of the devices 310a-310n. The universal wireless station 305 and devices 310a-310n of system 300 of FIG. 3 might be similar, if not identical, to the universal wireless station 105a or 105b and the devices 120a-120n, 150a-150n, and/or 155a-155n of system 100 of FIG. 1, and the descriptions of these components of system 100 of FIG. 1 are applicable to the corresponding components of system 300 of FIG. 3, respectively.

Figure 4A:
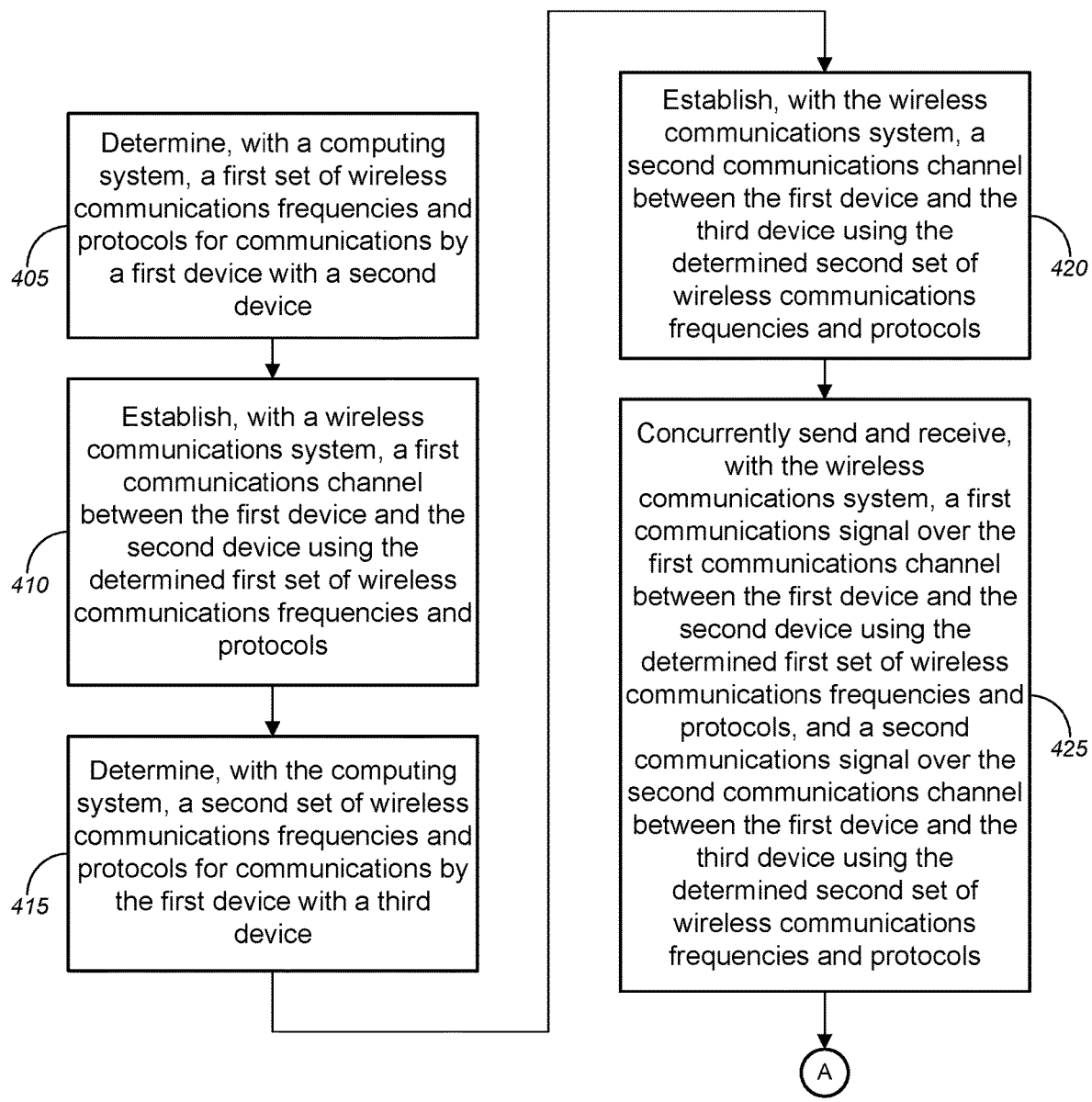
FIGS. 4A and 4B are flow diagrams illustrating a method for implementing multiple concurrent or simultaneous wireless services using a universal wireless station, in accordance with various embodiments.
Figure 4B:
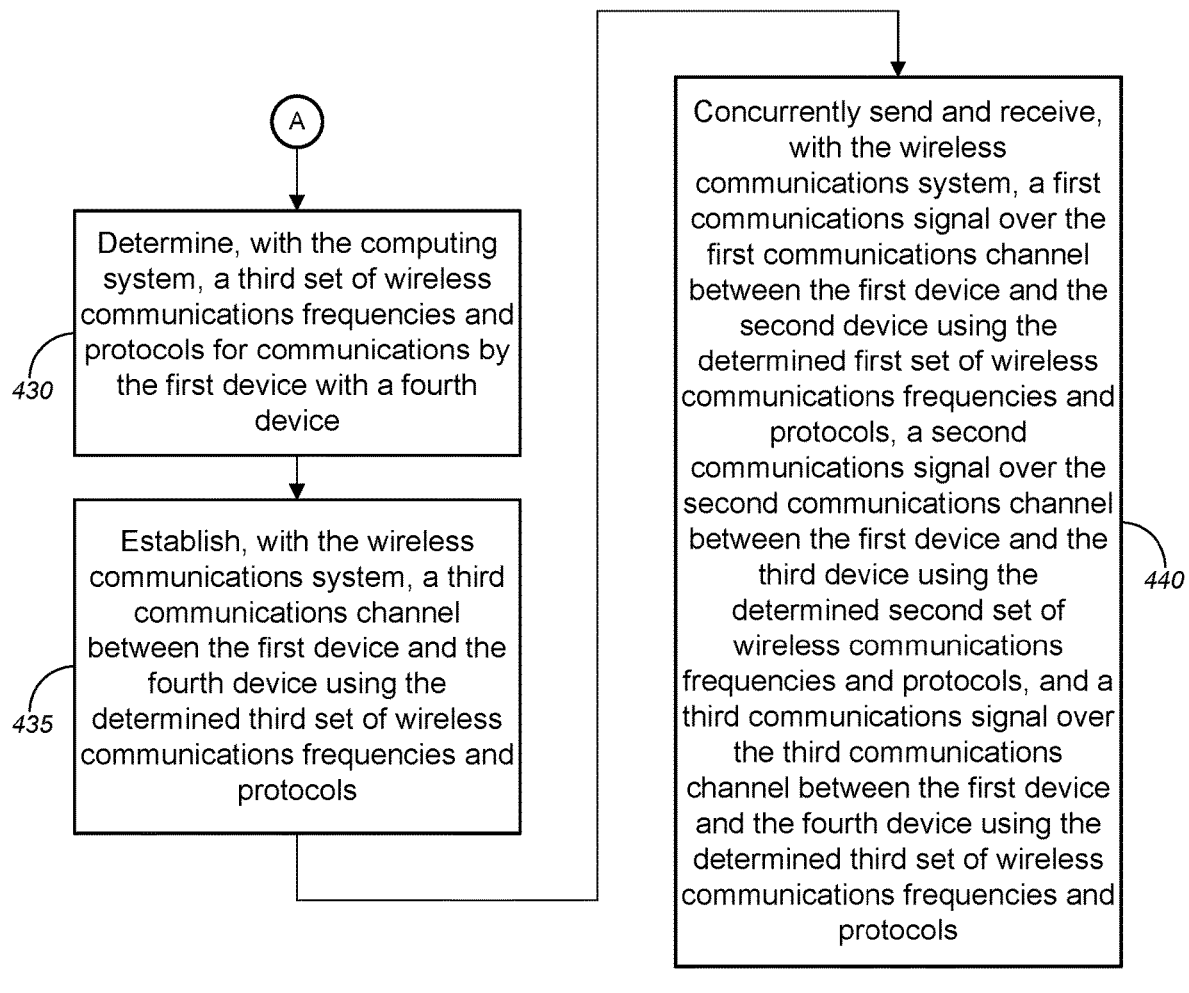

FIGS. 4A and 4B (collectively, "FIG. 4") are flow diagrams illustrating a method 400 for implementing multiple concurrent or simultaneous wireless services using a universal wireless station, in accordance with various embodiments. Method 400 of FIG. 4A continues onto FIG. 4B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, apparatuses, or embodiments 100, 200-200', and 300 of FIGS. 1, 2, and 3, respectively (or components thereof), such methods may also be implemented using any suitable hardware (or software) implementation. Similarly, while each of the systems, apparatuses, or embodiments 100, 200-200', and 300 of FIGS. 1, 2, and 3, respectively (or components thereof), can operate according to the method 400 illustrated by FIG. 4 (e.g., by executing instructions embodied on a computer readable medium), the systems, apparatuses, or embodiments 100, 200-200', and 300 of FIGS. 1, 2, and 3 can each also operate according to other modes of operation and/or perform other suitable procedures.

In the non-limiting embodiment of FIG. 4A, method 400, at block 405, might comprise determining, with a computing system (which might correspond to processor(s) 220 disposed within universal wireless station 205a or 205b of FIG. 2 or universal wireless stations 105a, 105b, 205a, 205b, and 305 themselves of FIGS. 1-3, or the like, or server(s) 125, gateway devices 110a or 110b, or service node or base 115b of FIG. 1, or the like), a first set of wireless communications frequencies and protocols for communications by a first device (which might correspond to universal wireless stations 105a, 105b, 205a, 205b, and 305 of FIGS. 1-3, or the like) with a second device (which might correspond to one of devices 120a-120n, 150a-150n, and 310a-310n of FIGS. 1 and 3, or the like). At block 410, method 400 might comprise establishing, with a wireless communications system (which might correspond to wireless communications systems 210a or 210b disposed within universal wireless station 205a or 205b of FIG. 2 or universal wireless stations 105a, 105b, 205a, 205b, and 305 themselves of FIGS. 1-3, or the like), a first communications channel between the first device (i.e., the universal wireless stations 105a, 105b, 205a, 205b, and 305 of FIGS. 1-3, or the like) and the second device (i.e., one of devices 120a-120n, 150a-150n, and 310a-310n of FIGS. 1 and 3, or the like) using the determined first set of wireless communications frequencies and protocols.

In some embodiments, the gateway device might include, without limitation, at least one of a residential gateway device, a business gateway device, an enterprise gateway device, or a network gateway device, and/or the like. In some cases, the universal wireless station might be disposed within or might otherwise be part of the gateway device (as shown, e.g., in the system 100 of FIG. 1, particularly with the embodiment of universal wireless station 105a within gateway device(s) 110a, or the like). Alternatively, the universal wireless station might be external to or separate from any gateway device, while being communicatively coupled to gateway device (as shown, e.g., in the system 100 of FIG. 1, particularly with the embodiment of universal wireless station 105b being communicatively coupled to, yet separate from or external to gateway device(s) 110b, or the like). In some instances, the universal wireless station might be located within one of a residential customer premises, a business customer premises, an enterprise customer premises, a service provider facility, or a government facility, and/or the like.

In some cases, the devices might each include, but is not limited to, one of a user device associated with a user, an Internet of Things ("IoT") capable device, an IoT-capable sensor device, or telecommunications equipment, and/or the like. According to some embodiments, the user device might include, without limitation, at least one of a tablet computer, a laptop computer, a desktop computer, a smart phone, a mobile phone, a telephone handset, a telephone base station, a facsimile machine, a household appliance, a kitchen appliance, a television, a set-top box, or a gaming console, wherein the telecommunications equipment comprises at least one of a telecommunications relay system, a satellite, a residential gateway device, a business gateway device, or customer premises equipment, and/or the like. In some embodiments, the household appliances might include, without limitation, one or more of a thermostat or environmental control system, a printer, a scanner, an image projection device, a video projection device, a door locking system, an automated door opening/closing system, a window locking system, an automated window opening or closing system, a window covering control system, a smart window, a solar cell or solar cell array, an electrical outlet or smart node, a power strip or bar, a dimmer switch, a data port, a sprinkler system, exercise equipment, one or more office devices, one or more lighting systems, one or more communications systems, a medical device, a telephone system, a speaker, a media recording and/or playback device, a lighting system, a customer premises security control system, one or more dedicated remote control devices, one or more universal remote control devices, a display device, one or more IoT-capable devices, and/or the like. The kitchen appliances, in some instances, might include, but are not limited to, one or more of a microwave oven, a refrigerator, an oven, a range, a stove, an induction cooktop, a pressure cooker, a rice cooker, a bread maker, a coffee machine, a kettle, a dishwasher, a food thermometer, and/or the like.

Method 400 might further comprise determining, with the computing system, a second set of wireless communications frequencies and protocols for communications by the first device (i.e., the universal wireless stations 105a, 105b, 205a, 205b, and 305 of FIGS. 1-3, or the like) with a third device (which might correspond to another one of devices 120a-120n, 150a-150n, and 310a-310n of FIGS. 1 and 3, or the like) (block 415) and establishing, with the wireless communications system, a second communications channel between the first device and the third device using the determined second set of wireless communications frequencies and protocols (block 420). Method 400, at block 425 might comprise concurrently sending and receiving, with the wireless communications system, a first communications signal over the first communications channel between the first device (i.e., the universal wireless stations 105a, 105b, 205a, 205b, and 305 of FIGS. 1-3, or the like) and the second device (i.e., the one of devices 120a-120n, 150a-150n, and 310a-310n of FIGS. 1 and 3, or the like) using the determined first set of wireless communications frequencies and protocols, and a second communications signal over the second communications channel between the first device (i.e., the universal wireless stations 105a, 105b, 205a, 205b, and 305 of FIGS. 1-3, or the like) and the third device (i.e., the another one of devices 120a-120n, 150a-150n, and 310a-310n of FIGS. 1 and 3, or the like) using the determined second set of wireless communications frequencies and protocols. Method 400 then proceeds to block 430 in FIG. 4B, following the circular marker denoted, "A."

With reference to FIG. 4B, method 400, at block 430, might comprise determining, with the computing system, a third set of wireless communications frequencies and protocols for communications by the first device with a fourth device (which might correspond to yet another one of devices 120a-120n, 150a-150n, and 310a-310n of FIGS. 1 and 3, or the like). Method 400 might further comprise establishing, with the wireless communications system, a third communications channel between the first device and the fourth device using the determined third set of wireless communications frequencies and protocols (block 435). At block 435, method 400 might comprise concurrently sending and receiving, with the wireless communications system, a first communications signal over the first communications channel between the first device (i.e., the universal wireless stations 105a, 105b, 205a, 205b, and 305 of FIGS. 1-3, or the like) and the second device (i.e., the one of devices 120a-120n, 150a-150n, and 310a-310n of FIGS. 1 and 3, or the like) using the determined first set of wireless communications frequencies and protocols, a second communications signal over the second communications channel between the first device (i.e., the universal wireless stations 105a, 105b, 205a, 205b, and 305 of FIGS. 1-3, or the like) and the third device (i.e., the another one of devices 120a-120n, 150a-150n, and 310a-310n of FIGS. 1 and 3, or the like) using the determined second set of wireless communications frequencies and protocols, and a third communications signal over the third communications channel between the first device (i.e., the universal wireless stations 105a, 105b, 205a, 205b, and 305 of FIGS. 1-3, or the like) and the fourth device (i.e., the yet another one of devices 120a-120n, 150a-150n, and 310a-310n of FIGS. 1 and 3, or the like) using the determined third set of wireless communications frequencies and protocols.

Merely by way of example, the first device, according to some embodiments, might comprise at least one antenna and at least one of a software-defined radio ("SDR") communications system and/or one or more physical layer wireless communications chipsets. In some instances, the at least one antenna might each transmit and receive wireless communication signals according to a set of protocols comprising at least one of IEEE 802.11a, IEEE 802.11b, IEEE 802.11g, IEEE 802.11n, IEEE 802.11ac, IEEE 802.11ad, IEEE 802.11ax, IEEE 802.11ay, IEEE 802.11af, or IEEE 802.15.4, and/or the like, where the set of protocols might be based at least in part on the determined first set of wireless communications frequencies and protocols, and based at least in part on the determined second set of wireless communications frequencies and protocols. In some cases, the at least one antenna might each transmit and receive wireless communication signals according to a set of protocols comprising at least one of Universal Mobile Telecommunications System ("UMTS"), Code Division Multiple Access ("CDMA"), Time Division Multiple Access ("TDMA"), Global System for Mobile Communication ("GSM"), Long Term Evolution ("LTE"), Personal Communications Service ("PCS"), Advanced Wireless Services ("AWS"), Emergency Alert System ("EAS"), Citizens Band Radio Service ("CBRS"), Broadband Radio Service ("BRS"), 6LowPAN, IEEE 802.11af, or LoRa, and/or the like, where the set of protocols might be based at least in part on the determined first set of wireless communications frequencies and protocols, and based at least in part on the determined second set of wireless communications frequencies and protocols. In some embodiments, the at least one antenna might each comprise at least one of a plurality of lateral patch antennas, a plurality of arrays of patch antennas, one or more microstrip patch antennas, a two-dimensional ("2D") leaky waveguide antenna, or a three-dimensional ("3D") array of antenna elements, and/or the like. In some cases, one or more of the at least one antenna might include at least one active antenna element. Alternatively, one or more of the at least one antenna might include only passive antenna elements. Exemplary embodiments of antennas that may be used in conjunction with the universal wireless station described herein are described in greater detail in the Related Applications, particularly in the '069, '532, '460, '676, and '665 applications, which have already been incorporated herein by reference in their entirety for all purposes.

Exemplary System and Hardware Implementation

Figure 5:
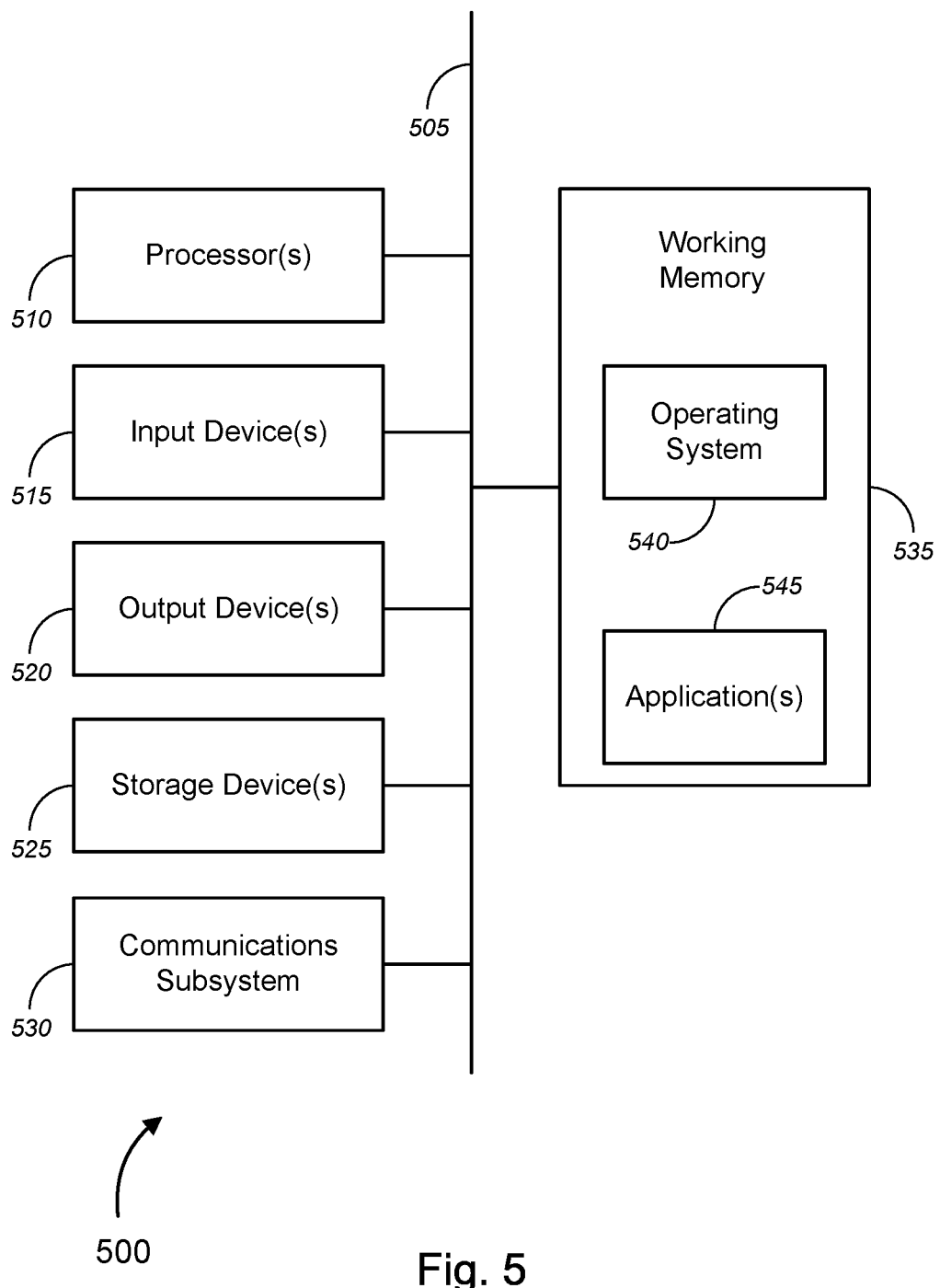
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., universal wireless stations 105a, 105b, 205a, 205b, and 305, wireless communications systems 210a and 210b, gateway devices 110a and 110b, server(s) 125, devices 120a-120n, 150a-150n, and 310a-310n, and wireless distribution devices 155a-155n, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., universal wireless stations 105a, 105b, 205a, 205b, and 305, wireless communications systems 210a and 210b, gateway devices 110a and 110b, server(s) 125, devices 120a-120n, 150a-150n, and 310a-310n, and wireless distribution devices 155a-155n, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
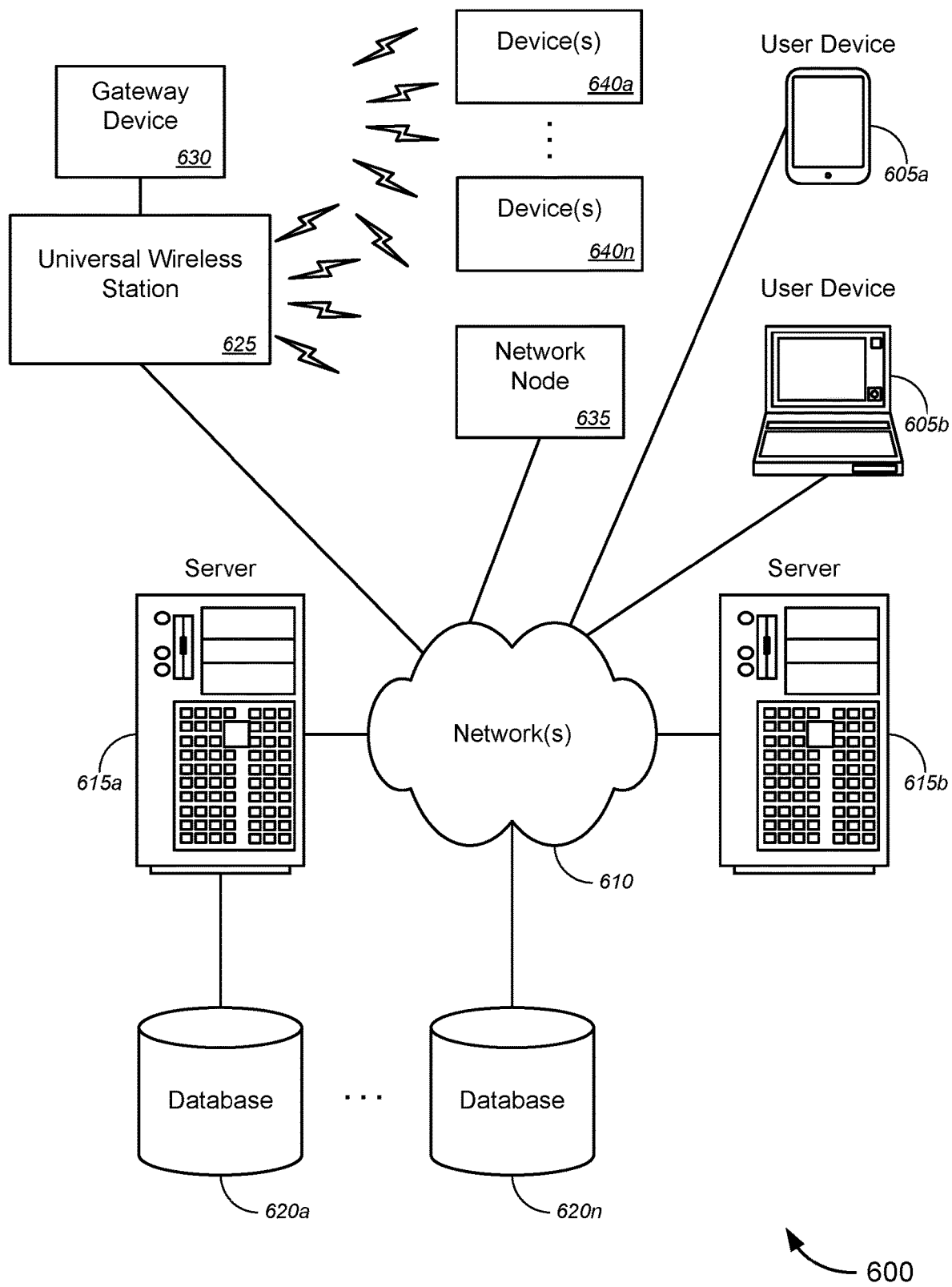
FIG. 6 is a block diagram illustrating a networked system of computers, computing systems, or system hardware architecture, which can be used in accordance with various embodiments.

As noted above, a set of embodiments comprises methods and systems for implementing wireless communications, and, more particularly, to methods, systems, and apparatuses for implementing multiple simultaneous wireless services using a universal wireless station. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 150 FIG. 1, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing wireless communications, and, more particularly, to methods, systems, and apparatuses for implementing multiple simultaneous wireless services using a universal wireless station, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620*a*-620*n* (collectively, "databases 620"). The location of each of the databases 620 is discretionary: merely by way of example, a database 620*a* might reside on a storage medium local to (and/or resident in) a server 615*a* (and/or a user computer, user device, or customer device 605). Alternatively, a database 620*n* can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a universal wireless station 625 (similar to universal wireless stations 105*a*, 105*b*, 205*a*, 205*b*, and 305 of FIGS. 1-3, or the like), a gateway device 630 (similar to gateway devices 110a and 110b of FIG. 1, or the like), a network node 635 (similar to service node or base 115b of FIG. 1, or the like), and one or more devices 640a-640n (collectively, "devices 640" or the like; which might be similar to devices 120a-120n, 150a-150n, and 310a-310n of FIGS. 1 and 3, or the like). In some embodiments, the gateway device 630 might include, without limitation, at least one of a residential gateway device, a business gateway device, an enterprise gateway device, or a network gateway device, and/or the like. In some cases, the universal wireless station 625 might be disposed within or might otherwise be part of the gateway device 630 (as shown, e.g., in the system 100 of FIG. 1, particularly with the embodiment of universal wireless station 105a within gateway device(s) 110a, or the like). Alternatively, the universal wireless station 625 might be external to or separate from any gateway device, while being communicatively coupled to gateway device 630 (as shown, e.g., in the system 100 of FIG. 1, particularly with the embodiment of universal wireless station 105b being communicatively coupled to, yet separate from or external to gateway device(s) 110b, or the like). In some instances, the universal wireless station 625 might be located within one of a residential customer premises, a business customer premises, an enterprise customer premises, a service provider facility, or a government facility, and/or the like. In some cases, the devices 605a, 605b, and 640a-640n might each include, but is not limited to, one of a user device associated with a user, an Internet of Things ("IoT") capable device, an IoT-capable sensor device, or telecommunications equipment, and/or the like. According to some embodiments, the user device might include, without limitation, at least one of a tablet computer, a laptop computer, a desktop computer, a smart phone, a mobile phone, a telephone handset, a telephone base station, a facsimile machine, a household appliance, a kitchen appliance, a television, a set-top box, or a gaming console, wherein the telecommunications equipment comprises at least one of a telecommunications relay system, a satellite, a residential gateway device, a business gateway device, or customer premises equipment, and/or the like.

In operation, the universal wireless station 625 (and/or one or more servers 615a-615b, or the like) might determine a first set of wireless communications frequencies and protocols for communications by universal wireless station 625 with a second device (i.e., one of devices 605a, 605b, and 640a-640n, or the like). The universal wireless station 625 might establish a first communications channel between the universal wireless station 625 and the second device using the determined first set of wireless communications frequencies and protocols. In a similar manner, the universal wireless station 625 (and/or the one or more servers 615a-615b, or the like) might determine a second set of wireless communications frequencies and protocols for communications by universal wireless station 625 with a third device (i.e., another one of devices 605a, 605b, and 640a-640n, or the like). The universal wireless station 625 might establish a second communications channel between the universal wireless station 625 and the third device using the determined second set of wireless communications frequencies and protocols. The universal wireless station 625 might subsequently concurrently send and receive both a first communications signal over the first communications channel between the universal wireless station 625 and the second device using the determined first set of wireless communications frequencies and protocols, and a second communications signal over the second communications channel between the universal wireless station 625 and the third device using the determined second set of wireless communications frequencies and protocols.

In some embodiments, the universal wireless station 625 (and/or the one or more servers 615a-615b, or the like) might further determine a third set of wireless communications frequencies and protocols for communications by universal wireless station 625 with a fourth device (i.e., yet another one of devices 605a, 605b, and 640a-640n, or the like). The universal wireless station 625 might establish a third communications channel between the universal wireless station 625 and the fourth device using the determined third set of wireless communications frequencies and protocols. The universal wireless station 625 might subsequently concurrently send and receive all of a first communications signal over the first communications channel between the universal wireless station 625 and the second device using the determined first set of wireless communications frequencies and protocols, a second communications signal over the second communications channel between the universal wireless station 625 and the third device using the determined second set of wireless communications frequencies and protocols, and a third communications signal over the third communications channel between the universal wireless station 625 and the fourth device using the determined third set of wireless communications frequencies and protocols. And so on.

Merely by way of example, the universal wireless station 625 might comprise at least one antenna and at least one of a software-defined radio ("SDR") communications system and/or one or more physical layer wireless communications chipsets. In some instances, the at least one antenna might each transmit and receive wireless communication signals according to a set of protocols comprising at least one of IEEE 802.11a, IEEE 802.11b, IEEE 802.11g, IEEE 802.11n, IEEE 802.11ac, IEEE 802.11ad, IEEE 802.11ax, IEEE 802.11ay, IEEE 802.11af, or IEEE 802.15.4, and/or the like, where the set of protocols might be based at least in part on the determined first set of wireless communications frequencies and protocols, and based at least in part on the determined second set of wireless communications frequencies and protocols. In some cases, the at least one antenna might each transmit and receive wireless communication signals according to a set of protocols comprising at least one of Universal Mobile Telecommunications System ("UMTS"), Code Division Multiple Access ("CDMA"), Time Division Multiple Access ("TDMA"), Global System for Mobile Communication ("GSM"), Long Term Evolution ("LTE"), Personal Communications Service ("PCS"), Advanced Wireless Services ("AWS"), Emergency Alert System ("EAS"), Citizens Band Radio Service ("CBRS"), Broadband Radio Service ("BRS"), 6LowPAN, IEEE 802.11af, or LoRa, and/or the like, where the set of protocols might be based at least in part on the determined first set of wireless communications frequencies and protocols, and based at least in part on the determined second set of wireless communications frequencies and protocols. In some embodiments, the at least one antenna might each comprise at least one of a plurality of lateral patch antennas, a plurality of arrays of patch antennas, one or more micro-strip patch antennas, a two-dimensional ("2D") leaky waveguide antenna, or a three-dimensional ("3D") array of antenna elements, and/or the like. In some cases, one or more of the at least one antenna might include at least one active antenna element. Alternatively, one or more of the at least one antenna might include only passive antenna elements.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    determining, with a computing system, a first set of wireless communications frequencies and protocols for communications by a first device with a second device;
    establishing, with a wireless communications system, a first communications channel between the first device and the second device using the determined first set of wireless communications frequencies and protocols;
    detecting, with the computing system, a second set of wireless communications frequencies and protocols for communications by the first device with a third device;
    based on the detection of the second set of wireless communications frequencies and protocols for communications by the first device with the third device, generating, with the wireless communications system, a second communications channel between the first device and the third device using the determined second set of wireless communications frequencies and protocols and establishing, with the wireless communications system, the second communications channel between the first device and the third device using the determined second set of wireless communications frequencies and protocols, wherein the wireless communications system does not have the second communications channel between the first device and the third device until the detection of the second set of wireless communications frequencies and protocols; and
    simultaneously sending and receiving, with the wireless communications system, a first communications signal over the first communications channel between the first device and the second device using the determined first set of wireless communications frequencies and protocols, and a second communications signal over the second communications channel between the first device and the third device using the determined second set of wireless communications frequencies and protocols, wherein the determined first set of wireless communications frequencies and protocols are different from the determined second set of wireless communications frequencies and protocols.

2. The method of claim 1, wherein the first device comprises the computing system and the wireless communications system.

3. The method of claim 2, wherein the first device is at least one of a residential gateway device, a business gateway device, an enterprise gateway device, or a network gateway device.

4. The method of claim 2, wherein the first device is external to any gateway device, and is communicatively coupled to at least one of a residential gateway device, a business gateway device, an enterprise gateway device, or a network gateway device.

5. The method of claim 1, wherein the first device comprises the wireless communications system, and wherein the computing system comprises one of a gateway device, a server computer, a network node, or a cloud computing system, each of which is separate from the first device.

6. The method of claim 1, wherein the first device is a universal wireless station that is located within one of a residential customer premises, a business customer premises, an enterprise customer premises, a service provider facility, or a government facility, and wherein the second device and the third device each comprises one of a user device associated with a user, an Internet of Things ("IoT") capable device, an IoT-capable sensor device, or telecommunications equipment.

7. The method of claim 6, wherein the user device comprises at least one of a tablet computer, a laptop computer, a desktop computer, a smart phone, a mobile phone, a telephone handset, a telephone base station, a facsimile machine, a household appliance, a kitchen appliance, a television, a set-top box, or a gaming console, wherein the telecommunications equipment comprises at least one of a telecommunications relay system, a satellite, a residential gateway device, a business gateway device, or customer premises equipment.

8. The method of claim 1, further comprising:
    determining, with the computing system, a third set of wireless communications frequencies and protocols for communications by the first device with a fourth device;
    establishing, with the wireless communications system, a third communications channel between the first device and the fourth device using the determined third set of wireless communications frequencies and protocols; and
    concurrently sending and receiving, with the wireless communications system, a first communications signal over the first communications channel between the first device and the second device using the determined first set of wireless communications frequencies and protocols, a second communications signal over the second communications channel between the first device and the third device using the determined second set of wireless communications frequencies and protocols, and a third communications signal over the third communications channel between the first device and the fourth device using the determined third set of wireless communications frequencies and protocols.

9. The method of claim 1, wherein the wireless communications system comprises at least one antenna and at least one of a software-defined radio ("SDR") communications system or one or more physical layer wireless communications chipsets.

10. The method of claim 9, wherein the at least one antenna each transmits and receives wireless communication signals according to a set of protocols comprising at least one of IEEE 802.11a, IEEE 802.11b, IEEE 802.11g, IEEE 802.11n, IEEE 802.11ac, IEEE 802.11ad, IEEE 802.11ax, IEEE 802.11ay, IEEE 802.11af, or IEEE 802.15.4, wherein the set of protocols are based at least in part on the determined first set of wireless communications frequencies and protocols, and based at least in part on the determined second set of wireless communications frequencies and protocols.

11. The method of claim 9, wherein the at least one antenna each transmits and receives wireless communication signals according to a set of protocols comprising at least one of Universal Mobile Telecommunications System ("UMTS"), Code Division Multiple Access ("CDMA"), Time Division Multiple Access ("TDMA"), Global System for Mobile Communication ("GSM"), Long Term Evolution ("LTE"), Personal Communications Service ("PCS"), Advanced Wireless Services ("AWS"), Emergency Alert System ("EAS"), Citizens Band Radio Service ("CBRS"), Broadband Radio Service ("BRS"), 6LowPAN, IEEE 802.11af, or LoRa, wherein the set of protocols are based at least in part on the determined first set of wireless communications frequencies and protocols, and based at least in part on the determined second set of wireless communications frequencies and protocols.

12. The method of claim 9, wherein the at least one antenna each comprises at least one of a plurality of lateral patch antennas, a plurality of arrays of patch antennas, one or more micro-strip patch antennas, a two-dimensional ("2D") leaky waveguide antenna, or a three-dimensional ("3D") array of antenna elements.

13. An apparatus, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
determine a first set of wireless communications frequencies and protocols for communications by the apparatus with a second device; and
detect a second set of wireless communications frequencies and protocols for communications by the apparatus with a third device; and a wireless communications system, comprising:
at least one antenna;
at least one second processor; and
a second non-transitory computer readable medium communicatively coupled to the at least one second processor, the second non-transitory computer readable medium having stored thereon computer software comprising a second set of instructions that, when executed by the at least one second processor, causes the wireless communications system to:
establish a first communications channel between the apparatus and the second device using the determined first set of wireless communications frequencies and protocols;
based on the detection of the second set of wireless communications frequencies and protocols for communications by the first device with the third device, generate a second communications channel between the first device and the third device using the determined second set of wireless communications frequencies and protocols and establish a second communications channel between the apparatus and the third device using the determined second set of wireless communications frequencies and protocols, wherein the wireless communications system does not have the second communications channel between the first device and the third device until the detection of the second set of wireless communications frequencies and protocols; and
simultaneously send and receive, via the at least one antenna, a first communications signal over the first communications channel between the apparatus and the second device using the determined first set of wireless communications frequencies and protocols, and a second communications signal over the second communications channel between the apparatus and the third device using the determined second set of wireless communications frequencies and protocols, wherein the determined first set of wireless communications frequencies and protocols are different from the determined second set of wireless communications frequencies and protocols.

14. The apparatus of claim 13, wherein the apparatus is at least one of a residential gateway device, a business gateway device, an enterprise gateway device, or a network gateway device.

15. The apparatus of claim 13, wherein the apparatus is external to any gateway device, and is communicatively coupled to at least one of a residential gateway device, a business gateway device, an enterprise gateway device, or a network gateway device.

16. The apparatus of claim 13, wherein the apparatus is a universal wireless station that is located within one of a residential customer premises, a business customer premises, an enterprise customer premises, a service provider facility, or a government facility, and wherein the second device and the third device each comprises one of a user device associated with a user, an Internet of Things ("IoT") capable device, an IoT-capable sensor device, or telecommunications equipment.

17. The apparatus of claim 14, wherein the user device comprises at least one of a tablet computer, a laptop computer, a desktop computer, a smart phone, a mobile phone, a telephone handset, a telephone base station, a facsimile machine, a household appliance, a kitchen appliance, a television, a set-top box, or a gaming console, wherein the telecommunications equipment comprises at least one of a telecommunications relay system, a satellite, a residential gateway device, a business gateway device, or customer premises equipment.

18. The apparatus of claim 13, wherein:
the first set of instructions, when executed by the at least one first processor, further causes the computing system to:
determine a third set of wireless communications frequencies and protocols for communications by the apparatus with a fourth device;
the second set of instructions, when executed by the at least one second processor, further causes the wireless communications system to:
establish a third communications channel between the apparatus and the fourth device using the determined third set of wireless communications frequencies and protocols; and
concurrently send and receive, via the at least one antenna, a first communications signal over the first communications channel between the apparatus and the second device using the determined first set of wireless communications frequencies and protocols, a second communications signal over the second communications channel between the apparatus and the third device using the determined second set of wireless communications frequencies and protocols, and a third communications signal over the third communications channel between the apparatus and the fourth device using the determined third set of wireless communications frequencies and protocols.

19. The apparatus of claim 13, wherein the wireless communications system further comprises at least one of a software-defined radio ("SDR") communications system or one or more physical layer wireless communications chipsets.

20. The apparatus of claim 13, wherein the at least one antenna each transmits and receives wireless communication signals according to a set of protocols comprising at least one of IEEE 802.11a, IEEE 802.11b, IEEE 802.11g, IEEE 802.11n, IEEE 802.11ac, IEEE 802.11ad, IEEE 802.11ax, IEEE 802.11ay, IEEE 802.11af, or IEEE 802.15.4, wherein the set of protocols are based at least in part on the determined first set of wireless communications frequencies and protocols, and based at least in part on the determined second set of wireless communications frequencies and protocols.

21. The apparatus of claim 13, wherein the at least one antenna each transmits and receives wireless communication signals according to a set of protocols comprising at least one of Universal Mobile Telecommunications System ("UMTS"), Code Division Multiple Access ("CDMA"), Time Division Multiple Access ("TDMA"), Global System for Mobile Communication ("GSM"), Long Term Evolution ("LTE"), Personal Communications Service ("PCS"), Advanced Wireless Services ("AWS"), Emergency Alert System ("EAS"), Citizens Band Radio Service ("CBRS"), Broadband Radio Service ("BRS"), 6LowPAN, IEEE 802.11af, or LoRa, wherein the set of protocols are based at least in part on the determined first set of wireless communications frequencies and protocols, and based at least in part on the determined second set of wireless communications frequencies and protocols.

22. The apparatus of claim 13, wherein the at least one antenna each comprises at least one of a plurality of lateral patch antennas, a plurality of arrays of patch antennas, one or more micro-strip patch antennas, a two-dimensional ("2D") leaky waveguide antenna, or a three-dimensional ("3D") array of antenna elements.

23. A system, comprising:
a first device, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
determine a first set of wireless communications frequencies and protocols for communications by the first device with a second device; and
detect a need for a second set of wireless communications frequencies and protocols for communications by the first device with a third device; and
a wireless communications system, comprising:
at least one first antenna;
at least one first transceiver;
at least one second processor; and
a second non-transitory computer readable medium communicatively coupled to the at least one second processor, the second non-transitory computer readable medium having stored thereon computer software comprising a second set of instructions that, when executed by the at least one second processor, causes the wireless communications system to:
establish a first communications channel between the first device and the second device using the determined first set of wireless communications frequencies and protocols;
based on the detection of the need for the second set of wireless communications frequencies and protocols for communications by the first device with the third device, generate a second communications channel between the first device and the third device using the determined second set of wireless communications frequencies and protocols and establish a second communications channel between the first device and the third device using the determined second set of wireless communications frequencies and protocols, wherein the wireless communications system does not have the second communications channel between the first device and the third device until the detection of the need for the second set of wireless communications frequencies and protocols; and
simultaneously send and receive, via the at least one antenna, a first communications signal over the first communications channel between the first device and the second device using the determined first set of wireless communications frequencies and protocols, and a second communications signal over the second communications channel between the first device and the third device using the determined second set of wireless communications frequencies and protocols wherein the determined first set of wireless communications frequencies and protocols are different from the determined second set of wireless communications frequencies and protocols;

the second device, comprising:
  at least one second antenna;
  at least one second transceiver;
  at least one third processor; and
  a third non-transitory computer readable medium communicatively coupled to the at least one third processor, the third non-transitory computer readable medium having stored thereon computer software comprising a third set of instructions that, when executed by the at least one third processor, causes the second device to:
    receive and send, via the at least one second transceiver and the at least one second antenna, the first communications signal over the first communications channel between the first device and the second device using the determined first set of wireless communications frequencies and protocols; and the third device, comprising:
  at least one third antenna;
  at least one third transceiver;
  at least one fourth processor; and
  a fourth non-transitory computer readable medium communicatively coupled to the at least one fourth processor, the fourth non-transitory computer readable medium having stored thereon computer software comprising a fourth set of instructions that, when executed by the at least one fourth processor, causes the third device to:
    receive and send, via the at least one third transceiver and the at least one third antenna, the second communications signal over the second communications channel between the first device and the third device using the determined second set of wireless communications frequencies and protocols.

24. The system of claim 23, wherein the first device is a universal wireless station that is located within one of a residential customer premises, a business customer premises, an enterprise customer premises, a service provider facility, or a government facility, and wherein the second device and the third device each comprises one of a user device associated with a user, an Internet of Things ("IoT") capable device, an IoT-capable sensor device, or telecommunications equipment.

25. The system of claim 24, wherein the user device comprises at least one of a tablet computer, a laptop computer, a desktop computer, a smart phone, a mobile phone, a telephone handset, a telephone base station, a facsimile machine, a household appliance, a kitchen appliance, a television, a set-top box, or a gaming console, wherein the telecommunications equipment comprises at least one of a telecommunications relay system, a satellite, a residential gateway device, a business gateway device, or customer premises equipment.

* * * * *